US012646235B2

(12) United States Patent
Koshino

(10) Patent No.: US 12,646,235 B2
(45) Date of Patent: Jun. 2, 2026

(54) IMAGE PROCESSING DEVICE, IMAGE PROCESSING METHOD, IMAGE PROCESSING PROGRAM, IMAGE DISPLAY DEVICE, IMAGE DISPLAY METHOD, AND IMAGE DISPLAY PROGRAM FOR PERFORMING TOMOSYNTHESIS IMAGING ON A BREAST

(71) Applicant: FUJIFILM Corporation, Tokyo (JP)

(72) Inventor: Riko Koshino, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 375 days.

(21) Appl. No.: 18/311,236

(22) Filed: May 3, 2023

(65) Prior Publication Data

US 2023/0267657 A1     Aug. 24, 2023

Related U.S. Application Data

(63) Continuation of application No. PCT/JP2021/039308, filed on Oct. 25, 2021.

(30) Foreign Application Priority Data

Nov. 9, 2020     (JP) ................................. 2020-186789

(51) Int. Cl.
*G06T 12/00* (2026.01)
*A61B 6/02* (2006.01)
*A61B 6/46* (2024.01)
(52) U.S. Cl.
CPC .......... *G06T 12/00* (2026.01); *G06T 2210/41* (2013.01)

(58) Field of Classification Search
CPC ............... G06T 11/003; G06T 2210/41; G06T 2207/10116; G06T 2207/20221;
(Continued)

(56) References Cited

U.S. PATENT DOCUMENTS

2008/0118138 A1*  5/2008  Zingaretti ............. G06T 7/0012
                                                345/420
2009/0123052 A1   5/2009  Ruth et al.
(Continued)

FOREIGN PATENT DOCUMENTS

JP        2014128716      7/2014
JP        2015177928      10/2015
(Continued)

OTHER PUBLICATIONS

"International Search Report (Form PCT/ISA/210) of PCT/JP2021/039308", mailed on Jan. 18, 2022, with English translation thereof, pp. 1-6.
(Continued)

*Primary Examiner* — Siamak Harandi
(74) *Attorney, Agent, or Firm* — JCIPRNET

(57) ABSTRACT

A processor acquires a composite two-dimensional image and region-of-interest information including information of a tomographic image corresponding to a region of interest on the composite two-dimensional image, displays a schema that schematically shows a breast and the composite two-dimensional image, and displays positions of the region of interest in the displayed schema and composite two-dimensional image in association with each other.

22 Claims, 24 Drawing Sheets

(58) Field of Classification Search
CPC ......... G06T 2207/30068; G06T 7/0012; G06T
11/008; G06T 12/00; A61B 6/463; A61B
6/469; A61B 6/502; A61B 6/468; A61B
6/025; A61B 6/032; A61B 6/0414
See application file for complete search history.

(56)             References Cited

U.S. PATENT DOCUMENTS

| | | |
|---|---|---|
| 2011/0109650 A1 | 5/2011 | Kreeger et al. |
| 2012/0051613 A1 | 3/2012 | Kamiya et al. |
| 2015/0269766 A1 | 9/2015 | Kobayashi |
| 2016/0095563 A1 | 4/2016 | Fukuda et al. |
| 2016/0235380 A1 | 8/2016 | Smith et al. |
| 2018/0033143 A1* | 2/2018 | Buelow .................. A61B 6/025 |
| 2018/0070892 A1 | 3/2018 | Sugiyama et al. |
| 2018/0166167 A1 | 6/2018 | Kanada |
| 2018/0292978 A1* | 10/2018 | Davies ................... G16H 15/00 |
| 2019/0053776 A1 | 2/2019 | Ruth et al. |
| 2021/0228170 A1 | 7/2021 | Fukuda |
| 2023/0008465 A1 | 1/2023 | Smith et al. |

FOREIGN PATENT DOCUMENTS

| | | |
|---|---|---|
| JP | 2016533803 | 11/2016 |
| JP | 2017047079 | 3/2017 |
| JP | 2018043001 | 3/2018 |
| JP | 2018512913 | 5/2018 |
| JP | 2018097463 | 6/2018 |
| JP | 2019062983 | 4/2019 |
| WO | 2020080082 | 4/2020 |

OTHER PUBLICATIONS

"Written Opinion of the International Searching Authority (Form PCT/ISA/237) of PCT/JP2021/039308", mailed on Jan. 18, 2022, with English translation thereof, pp. 1-8.
"Search Report of Europe Counterpart Application", issued on Apr. 2, 2024, p. 1-p. 9.
"Notice of Reasons for Refusal of Japan Counterpart Application", issued on Sep. 9, 2025, with English translation thereof, pp. 1-9.
"Decision of Refusal of Japan Counterpart Application", issued on Jan. 6, 2026, with English translation thereof, pp. 1-3.
"Office Action of Europe Counterpart Application", issued on Mar. 20, 2026, p. 1-p. 5.

\* cited by examiner

| TOOL | ▶ | |
|---|---|---|
| ANNOTATION | ▶ | |
| BOOKMARK | ▶ | |
| REGION OF INTEREST | ▶ | REGION OF INTEREST R1 |
| UTILITY | ▶ | REGION OF INTEREST R2 |

IMAGE PROCESSING DEVICE, IMAGE PROCESSING METHOD, IMAGE PROCESSING PROGRAM, IMAGE DISPLAY DEVICE, IMAGE DISPLAY METHOD, AND IMAGE DISPLAY PROGRAM FOR PERFORMING TOMOSYNTHESIS IMAGING ON A BREAST

CROSS-REFERENCE TO RELATED APPLICATIONS

The present application is a Continuation of PCT International Application No. PCT/JP2021/039308, filed on Oct. 25, 2021, which claims priority to Japanese Patent Application No. 2020-186789, filed on Nov. 9, 2020. Each application above is hereby expressly incorporated by reference, in its entirety, into the present application.

BACKGROUND

Technical Field

The present disclosure relates to an image processing device, an image processing method an image processing program, an image display device, an image display method, and an image display program.

Related Art

In recent years, image diagnosis using a radiography apparatus (called mammography) for capturing an image of a breast has attracted attention in order to promote early detection of breast cancer. Further, in the mammography, tomosynthesis imaging has been proposed which moves a radiation source, irradiates the breast with radiation at a plurality of radiation source positions to acquire a plurality of projection images, and reconstructs the plurality of acquired projection images to generate tomographic images in which desired tomographic planes have been highlighted.

In the mammography, in many cases, for each of the left and right breasts, craniocaudal view (CC) imaging, which compresses the breast interposed in an up-down direction and images the breast, and mediolateral oblique view (MLO) imaging, which compresses the breast interposed obliquely at an angle of about 60° and images the breast, are performed. Therefore, for each of four types of imaging, the tomosynthesis imaging is performed to generate tomographic images.

In addition, a technique has been known which combines a plurality of tomographic images at distances (positions in a height direction) from a detection surface of a radiation detector to a radiation source, which have been acquired by tomosynthesis imaging, using, for example, an addition method, an averaging method, a maximum intensity projection method, or a minimum intensity projection method to generate a pseudo two-dimensional image (hereinafter, referred to as a composite two-dimensional image) corresponding to a simple two-dimensional image (see JP2014-128716A).

Meanwhile, in a medical field, a computer aided diagnosis (hereinafter, referred to as CAD) system has been known which automatically detects a structure, such as an abnormal shadow, in an image and performs, for example, highlighting on the detected structure. For example, the CAD is used to detect important diagnostic structures, such as a tumor, a spicula, and a calcification, from the tomographic images acquired by the tomosynthesis imaging. In addition, an interpretation report describing findings about abnormal shadows included in a medical image is created with reference to a detection result of the CAD.

Further, in a detailed examination of the breast, in many cases, a lesion pointed out by mammography is evaluated by ultrasonography. In a case in which ultrasonography is performed, in order to easily image a lesion position pointed out by the mammography, a schema that schematically shows the breast is displayed on an ultrasound apparatus, and a mark indicating the lesion position is given to the schema (see JP2018-043001A).

However, dozens of tomographic images created by one tomosynthesis imaging operation. Therefore, in a case in which the CC imaging and the MLO imaging are performed on the left and right breasts, a radiologist needs to interpret a large number of tomographic images, which is a heavy burden on the radiologist.

SUMMARY OF THE INVENTION

The present disclosure has been made in view of the above circumstances, and an object of the present disclosure is to reduce a burden on a radiologist who interprets an image acquired by mammography.

According to the present disclosure, there is provided an image processing device comprising at least one processor. The processor acquires a detection result of at least one region of interest from a plurality of projection images acquired by performing tomosynthesis imaging on a breast or a plurality of tomographic images which indicate tomographic planes of the breast and are derived from the projection images, derives a composite two-dimensional image using the plurality of projection images or the plurality of tomographic images, and stores region-of-interest information including information of the tomographic image corresponding to the region of interest on the composite two-dimensional image and the composite two-dimensional image in association with each other.

In addition, in the image processing device according to the present disclosure, the processor may store the composite two-dimensional image and the region-of-interest information as separate files.

Further, in the image processing device according to the present disclosure, the processor may store the region-of-interest information in accessory information of the composite two-dimensional image to store the region-of-interest information and the composite two-dimensional image in association with each other.

Furthermore, in the image processing device according to the present disclosure, the region-of-interest information may include information indicating an outer shape of the region of interest and information for specifying a representative tomographic image that represents the tomographic images including the region of interest.

Moreover, in the image processing device according to the present disclosure, the region-of-interest information may include a reference point in the region of interest, a size of the region of interest, and information for specifying a representative tomographic image that represents the tomographic images including the region of interest.

According to the present disclosure, there is provided an image display device comprising at least one processor. The processor acquires the composite two-dimensional image and the region-of-interest information stored by the image processing device according to the present disclosure, displays a schema that schematically shows the breast and the composite two-dimensional image, and displays positions of the region of interest in the displayed schema and composite two-dimensional image in association with each other.

In addition, in the image display device according to the present disclosure, the processor may display a list of the detected regions of interest, plot the position of a region of interest selected from the list of the regions of interest on the schema, and highlight the selected region of interest in the composite two-dimensional image.

Further, in the image display device according to the present disclosure, the processor may plot the positions of all of the regions of interest on the schema and highlight a region of interest selected from the regions of interest plotted on the schema in the composite two-dimensional image.

Furthermore, in the image display device according to the present disclosure, the processor may display a generation screen for generating an interpretation report including findings for each of the regions of interest, display a list of the detected regions of interest on the generation screen, plot the position of a region of interest selected from the list of the regions of interest on the schema, and highlight the selected region of interest in the composite two-dimensional image.

Moreover, in the image display device according to the present disclosure, the processor may generate the interpretation report in which a schema on which the positions of the regions of interest have been plotted is described.

In addition, in the image display device according to the present disclosure, the processor may receive designation of a position in the displayed composite two-dimensional image. In a case in which a position of the region of interest is designated in the composite two-dimensional image, the processor may plot the position of the region of interest, which corresponds to the designated position, on the schema.

Further, in the image display device according to the present disclosure, the processor may highlight the designated region of interest in the composite two-dimensional image.

Furthermore, in the image display device according to the present disclosure, the processor may receive movement of a cursor in the displayed composite two-dimensional image. In a case in which the cursor approaches the position of the region of interest in the composite two-dimensional image, the processor may plot the position of the region of interest corresponding to a position of the cursor on the schema. In a case in which the cursor is moved away from the position of the region of interest, the processor may remove the plot from the schema.

Moreover, in the image display device according to the present disclosure, the processor may highlight the region of interest corresponding to the position of the cursor in the composite two-dimensional image in a case in which the cursor approaches the position of the region of interest in the composite two-dimensional image and remove the highlighting of the region of interest in the composite two-dimensional image in a case in which the cursor is moved away from the position of the region of interest.

In addition, in the image display device according to the present disclosure, the processor may display slice lines indicating the plurality of tomographic images on the schema.

Further, in the image display device according to the present disclosure, the processor may further acquire another composite two-dimensional image, which has an imaging direction different from that of the acquired composite two-dimensional image, for the same breast and another region-of-interest information item for the other composite two-dimensional composite image, further display the other composite two-dimensional image and another schema for the other composite two-dimensional image, and display the same region of interest in the displayed schema and other schema in association with each other.

Furthermore, in the image display device according to the present disclosure, the processor may display the regions of interest having at least one of the same position or the same size in the displayed composite two-dimensional image and other composite two-dimensional image in association with each other.

Moreover, in the image display device according to the present disclosure, the processor may receive designation of a position in one of the displayed composite two-dimensional image and other composite two-dimensional image, measure a distance from a reference point to the designated position in the one image, and display an index indicating the same distance as the measured distance from a corresponding reference point, which corresponds to the reference point of the one image, in the other of the composite two-dimensional image and the other composite two-dimensional image.

According to the present disclosure, there is provided an image processing method comprising: acquiring a detection result of at least one region of interest from a plurality of projection images acquired by performing tomosynthesis imaging on a breast or a plurality of tomographic images which indicate tomographic planes of the breast and are derived from the projection images; deriving a composite two-dimensional image using the plurality of projection images or the plurality of tomographic images; and storing region-of-interest information including information of the tomographic image corresponding to the region of interest on the composite two-dimensional image and the composite two-dimensional image in association with each other.

According to the present disclosure, there is provided an image display method comprising: acquiring the composite two-dimensional image and the region-of-interest information stored by the image processing device according to the present disclosure; displaying a schema that schematically shows the breast and the composite two-dimensional image; and displaying positions of the region of interest in the displayed schema and composite two-dimensional image in association with each other.

In addition, programs that cause a computer to perform the image processing method and the image display method according to the present disclosure may be provided.

According to the present disclosure, it is possible to reduce the burden on a radiologist who interprets an image acquired by mammography.

BRIEF DESCRIPTION OF THE DRAWINGS

FIG. 18 is a diagram illustrating a display screen for a schema and a composite two-dimensional image in a case in which a plurality of regions of interest are included.

DETAILED DESCRIPTION

Figure 1:
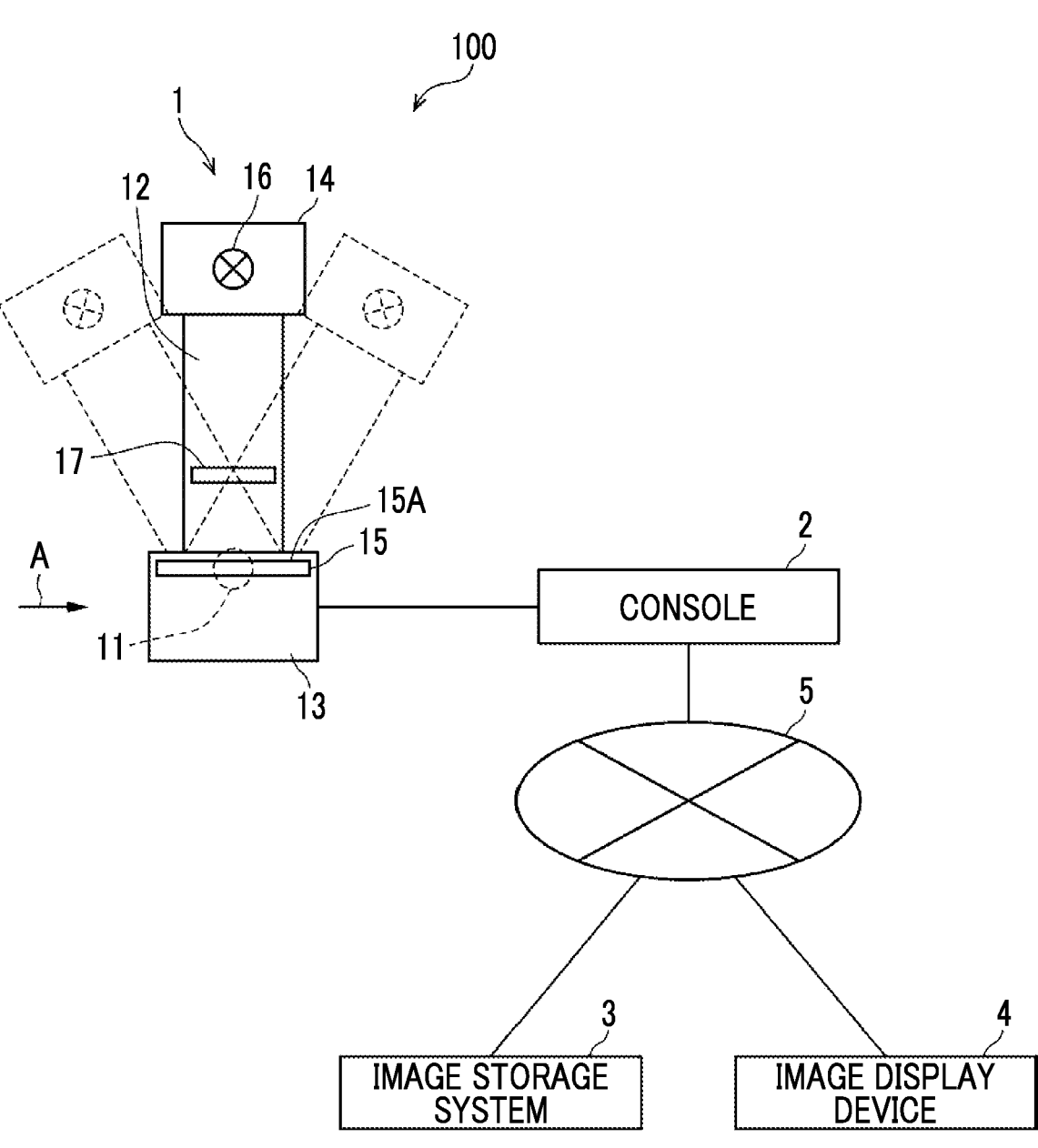
FIG. 1 is a diagram illustrating a schematic configuration of a radiography system to which an image processing device and an image display device according to a first embodiment of the present disclosure are applied.
Figure 2:
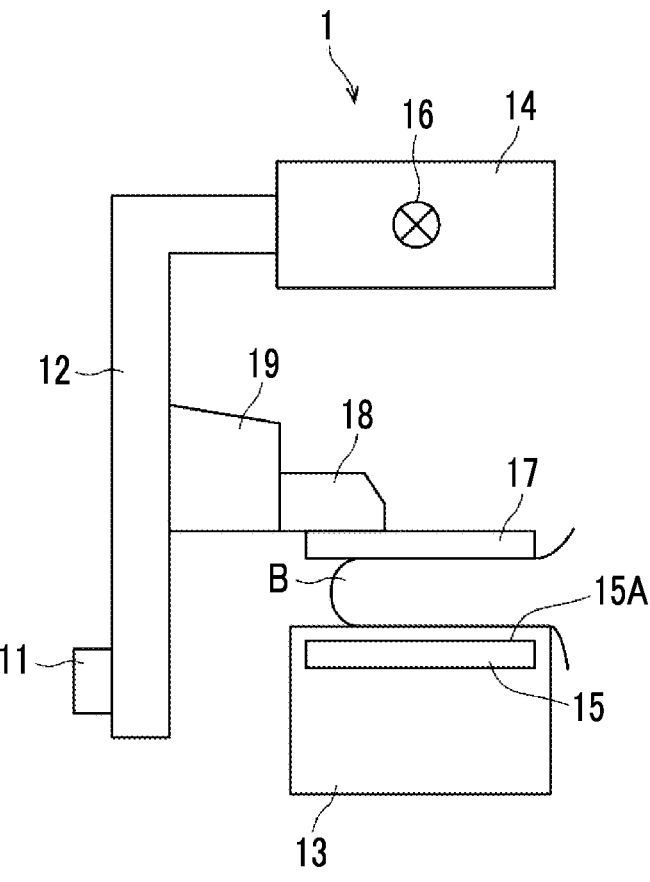
FIG. 2 is a diagram illustrating a radiography apparatus as viewed from a direction of an arrow A in FIG. 1.

Hereinafter, embodiments of the present disclosure will be described with reference to the drawings. FIG. 1 is a diagram schematically illustrating a configuration of a radiography system to which an image processing device and an image display device according to an embodiment of the present disclosure are applied. FIG. 2 is a diagram illustrating a mammography apparatus in the radiography system as viewed from a direction of an arrow A in FIG. 1. As illustrated in FIG. 1, a radiography system 100 according to this embodiment images a breast B, which is an object, at a plurality of radiation source positions and acquires a plurality of radiographic images, that is, a plurality of projection images, in order to perform tomosynthesis imaging on the breast B to generate tomographic images. The radiography system 100 according to this embodiment comprises a mammography apparatus 1, an image storage system 3, and an image display device 4. The mammography apparatus 1 comprises a console 2 that performs various types of control on the mammography apparatus 1. The console 2, the image storage system 3, and the image display device 4 are connected to each other through a network 5 such as a wireless communication local area network (LAN). The console 2 includes the image processing device according to this embodiment.

The mammography apparatus 1 comprises an arm portion 12 that is connected to a base (not illustrated) by a rotation shaft 11. An imaging table 13 is attached to one end of the arm portion 12, and a radiation emitting unit 14 is attached to the other end of the arm portion 12 to face the imaging table 13. The arm portion 12 is configured such that only the end to which the radiation emitting unit 14 is attached can be rotated. Therefore, the imaging table 13 is fixed, and only the radiation emitting unit 14 can be rotated.

A radiation detector 15, such as a flat panel detector, is provided in the imaging table 13. The radiation detector 15 has a detection surface 15A for radiation. In addition, for example, a circuit substrate including a charge amplifier that converts a charge signal read from the radiation detector 15 into a voltage signal, a correlated double sampling circuit that samples the voltage signal output from the charge amplifier, and an analog-digital (AD) conversion unit that converts the voltage signal into a digital signal is also provided in the imaging table 13.

A radiation source 16 is accommodated in the radiation emitting unit 14. The radiation source 16 emits, for example, X-rays as the radiation. The console 2 controls the timing when the radiation source 16 emits the radiation and radiation generation conditions of the radiation source 16, that is, the selection of target and filter materials, a tube voltage, an irradiation time, and the like.

Further, the arm portion 12 is provided with a compression plate 17 that is disposed above the imaging table 13 and presses and compresses the breast B, a support portion 18 that supports the compression plate 17, and a movement mechanism 19 that moves the support portion 18 in an up-down direction in FIGS. 1 and 2. In addition, an interval between the compression plate 17 and the imaging table 13, that is, a compression thickness is input to the console 2.

The console 2 has a function of controlling the mammography apparatus 1 using, for example, an imaging order and various types of information acquired from a radiology information system (RIS) (not illustrated) or the like through the network 5 and instructions or the like directly issued by a radiology technician or the like. Specifically, the console 2 directs the mammography apparatus 1 to perform the tomosynthesis imaging on the breast B, acquires a plurality of projection images as described below, and reconstructs the plurality of projection images to generate a plurality of tomographic images.

The image storage system 3 is a system that stores image data such as radiographic images and tomographic images captured by the mammography apparatus 1. The image storage system 3 extracts an image corresponding to a request from, for example, the image display device 4 from the stored images and transmits the image to the device that is the source of the request. A specific example of the image storage system 3 is a picture archiving and communication system (PACS).

Figure 3:
FIG. 3 is a diagram illustrating a schematic configuration of the image processing device according to the first embodiment.
Figure 3:
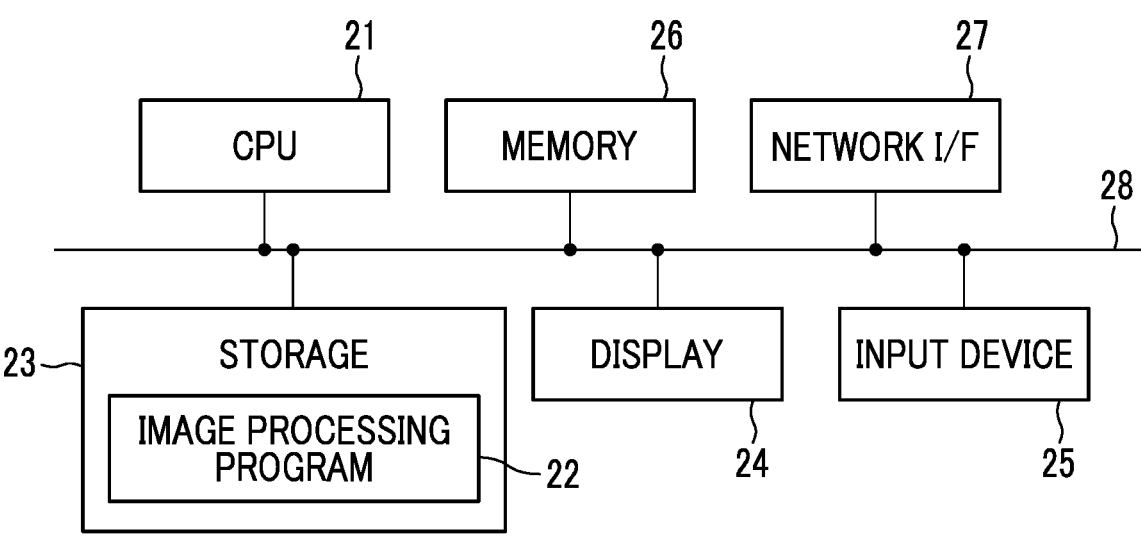

Next, an image processing device according to a first embodiment will be described. First, a hardware configuration of the image processing device (console 2) according to the first embodiment will be described with reference to FIG. 3. As illustrated in FIG. 3, the console 2 is a computer, such as a workstation, a server computer, or a personal computer, and comprises a central processing unit (CPU) 21, a non-volatile storage 23, and a memory 26 as a temporary storage area. In addition, the console 2 comprises a display 24, such as a liquid crystal display, an input device 25, such as a keyboard and a mouse, and a network interface (I/F) 27 that is connected to the network 5. The CPU 21, the storage 23, the display 24, the input device 25, the memory 26, and the network I/F 27 are connected to a bus 28. In addition, the CPU 21 is an example of a processor according to the present disclosure.

The storage 23 is implemented by, for example, a hard disk drive (HDD), a solid state drive (SSD), and a flash memory. An image processing program 22 installed in the console 2 is stored in the storage 23 as a storage medium. The CPU 21 reads the image processing program 22 from the storage 23, expands the image processing program 22 in the memory 26, and executes the expanded image processing program 22.

In addition, the image processing program 22 is stored in a storage device of a server computer connected to the network or a network storage in a state in which it can be accessed from the outside and is downloaded and installed in the computer constituting the console 2 as required. Alternatively, the program is recorded on a recording medium, such as a digital versatile disc (DVD) or a compact disc read only memory (CD-ROM), is distributed, and is installed in the computer constituting the console 2 from the recording medium.

Figure 4:
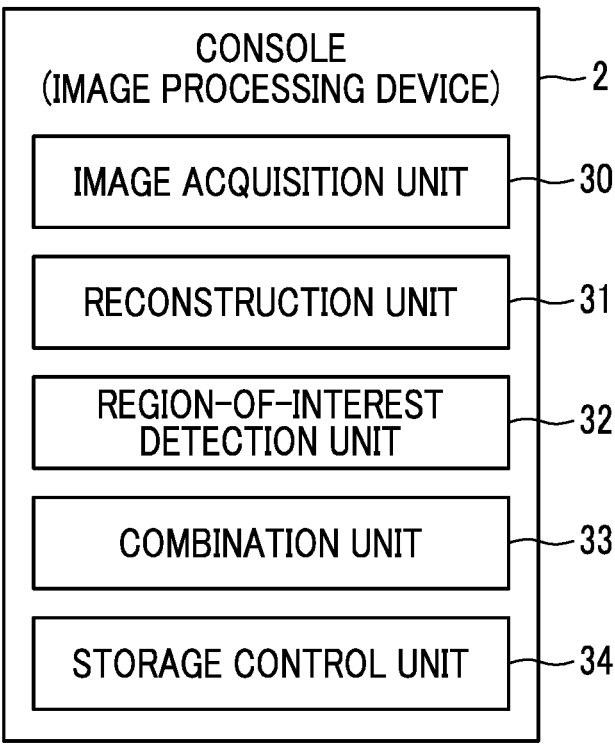
FIG. 4 is a diagram illustrating a functional configuration of the image processing device according to the first embodiment.

Next, a functional configuration of the console 2 according to the first embodiment will be described. FIG. 4 is a diagram illustrating the functional configuration of the console 2 (image processing device) according to the first embodiment. As illustrated in FIG. 4, the console 2 comprises an image acquisition unit 30, a reconstruction unit 31, a region-of-interest detection unit 32, a combination unit 33, and a storage control unit 34. Then, the CPU 21 executes the image processing program 22 such that the console 2 functions as the image acquisition unit 30, the reconstruction unit 31, the region-of-interest detection unit 32, the combination unit 33, and the storage control unit 34.

The image acquisition unit 30 directs the mammography apparatus 1 to perform the tomosynthesis imaging on the breast B to acquire the projection images of the breast B. Hereinafter, the tomosynthesis imaging will be described. In a case in which the tomosynthesis imaging is performed, the console 2 rotates the arm portion 12 about the rotation shaft 11 to move the radiation source 16, directs the radiation source 16 to irradiate the breast B with radiation at a plurality of radiation source positions caused by the movement of the radiation source 16 under predetermined imaging conditions for tomosynthesis imaging, detects the radiation transmitted through the breast B using the radiation detector 15, and acquires a plurality of projection images Gi (i=1 to n, where n is the number of radiation source positions and is, for example, 15) at the plurality of radiation source positions.

Figure 5:
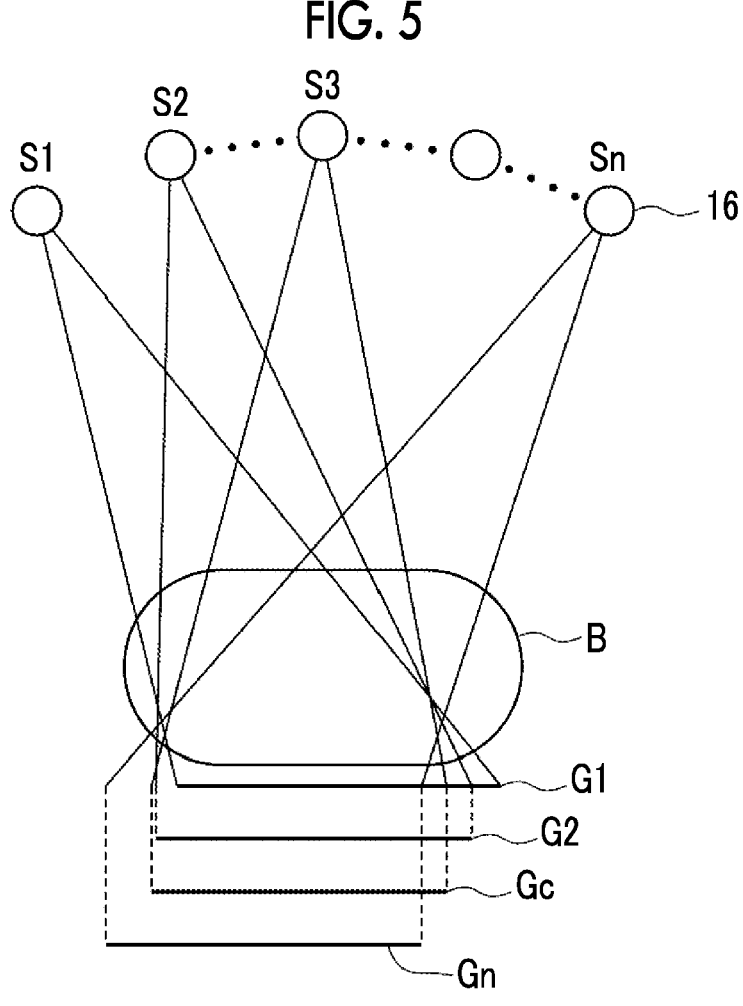
FIG. 5 is a diagram illustrating tomosynthesis imaging.

FIG. 5 is a diagram illustrating the acquisition of the projection images Gi. As illustrated in FIG. 5, the radiation source 16 is moved to each of radiation source positions S1, S2, . . . , and Sn. The radiation source 16 is driven at each radiation source position to irradiate the breast B with radiation. The radiation detector 15 detects the radiation transmitted through the breast B to acquire projection images G1, G2, . . . , and Gn corresponding to the radiation source positions S1 to Sn, respectively. In addition, at each of the radiation source positions S1 to Sn, the breast B is irradiated with the same dose of radiation.

In addition, in this embodiment, the image acquisition unit 30 may be configured to perform imaging on each of the left and right breasts in two directions of a cranio-caudal (CC) direction and a medio-lateral oblique (MLO) direction.

Figure 6:
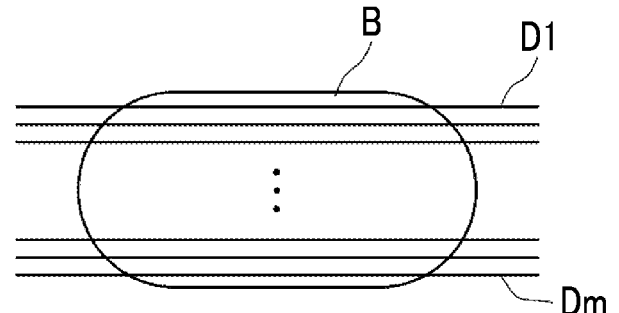
FIG. 6 is a diagram illustrating generation of tomographic images.

Then, the reconstruction unit 31 reconstructs the plurality of projection images Gi to generate tomographic images in which the desired tomographic planes of the breast B have been highlighted. Specifically, the console 2 reconstructs the plurality of projection images Gi using a known back projection method, such as a simple back projection method or a filtered back projection method, to generate a plurality of tomographic images Dj (j=1 to m) in each of a plurality of tomographic planes of the breast B as illustrated in FIG. 6. In this case, a three-dimensional coordinate position in a three-dimensional space including the breast B is set, the pixel values of the corresponding pixels in the plurality of projection images Gi are reconstructed for the set three-dimensional coordinate position, and pixel values at the coordinate positions of the pixels are calculated.

The region-of-interest detection unit 32 acquires a detection result of a region of interest from the plurality of tomographic images Dj. Specifically, the detection result is acquired by detecting the region of interest from the tomographic images Dj using a known computer aided diagnosis (hereinafter, referred to as CAD) algorithm. For example, a trained model subjected to machine learning to detect an abnormal part of the breast B, which is described in JP2018-097463A, can be used as a detection method using the CAD. In addition, the region-of-interest detection unit 32 may detect the region of interest from the plurality of projection images Gi.

The combination unit 33 generates a composite two-dimensional image CG0 using, for example, a method described in JP2014-128716A. The method described in JP2014-128716A is a method that projects a plurality of tomographic images in a depth direction, in which the tomographic planes of the breast B are arranged, to generate the composite two-dimensional image CG0. In addition, a method for generating the composite two-dimensional image is not limited to this. For example, the composite two-dimensional image CG0 may be generated by adding pixel values at pixel positions, which correspond to each other in the depth direction in which the tomographic planes of the breast B are arranged, in the plurality of tomographic images. In addition, the composite two-dimensional image CG0 may be generated by projecting a plurality of tomographic images in the depth direction, in which the tomographic planes of the breast B are arranged, using a minimum intensity projection method.

The storage control unit 34 stores information (hereinafter, referred to as region-of-interest information) related to the region of interest detected from the plurality of tomographic images Dj by the region-of-interest detection unit 32 and the composite two-dimensional image CG0 in the storage 23 or the memory 26 to be associated with each other. Here, the composite two-dimensional image CG0 is represented as, for example, image data in a so-called digital imaging and communications in medicine (DICOM) format to which patient identification information has been attached and has a DICOM tag that stores accessory information. In a case in which the region of interest is detected in any tomographic image Dj among the plurality of tomographic images Dj, the region-of-interest information is stored in the DICOM tag (hereinafter, simply referred to as a tag in some cases) of the composite two-dimensional image CG0. A private tag that is a vendor-specific tag can be used as the DICOM tag that stores the region-of-interest information.

Specifically, the region-of-interest information includes, for example, identification information of a detected region of interest R0, information indicating the outer shape of the region of interest, and a slice number of the tomographic image Dj that best represents the region of interest. The information indicating the outer shape of the region of interest is a pixel position on the contour of the region of interest. In addition, instead of the information indicating the outer shape of the region of interest, a reference point in the region of interest and the size of the region of interest may be used. The position of the center of gravity of the region of interest can be used as the reference point in the region of interest. The size of the region of interest in an up-down direction and a left-right direction in the tomographic images Dj can be used as the size of the region of interest. The region of interest is three-dimensionally present in the breast B. A tomographic image having the maximum region of interest among a plurality of tomographic images including the same region of interest can be used as the tomographic image that best represents the region of interest.

Further, in the case of the composite two-dimensional image CG0 in the MLO direction, an imaging angle in a case in which imaging is performed by the mammography apparatus 1, that is, an angle at which the radiation detector 15 is installed is stored in a positioner primary angle (PA) which is a public tag of the DICOM.

Further, in a case in which the combination unit 33 generates the composite two-dimensional image CG0 from the projection images Gi instead of the tomographic images Dj, the region-of-interest detection unit 32 may detect the region of interest not in a plurality of reconstructed tomographic images Dj but in a plurality of projection images Gi acquired by the tomosynthesis imaging. In this case, it is necessary to convert the position of the detected region of interest into a position in the three-dimensionally reconstructed tomographic image Dj, to perform conversion into the slice number of the tomographic image Dj, to include the position in the region-of-interest information, and to store the region-of-interest information in the tag of the composite two-dimensional image CG0.

In addition, various types of information including the slice number corresponding to the region of interest can be stored in the DICOM tag. Further, service objective pair (SOP) instance unique identifiers (UIDs) of other images can be stored in the DICOM tag. Furthermore, study instance unique identifiers (UIDs) and series instance unique identifiers (UIDs) of these other images in the DICOM standard can also be stored.

In addition, instead of storing the region-of-interest information in the tag of the composite two-dimensional image CG0, the storage control unit 34 may be configured to store the region-of-interest information, for example, in a DICOM-structured report (SR) file in which only data that does not include an image is stored.

In addition, the storage control unit 34 transmits the plurality of tomographic images Dj and the composite two-dimensional image CG0 stored in the storage 23 or the memory 26 to the image storage system 3 through the network 5. In addition, the plurality of projection images Gi acquired by the tomosynthesis imaging may be transmitted to the image storage system 3 through the network 5. Further, both the tomographic images Dj and the projection images Gi may be transmitted to the image storage system 3.

Here, in a case in which CC imaging and ML0 imaging are performed on each of the left and right breasts of the patient, a composite two-dimensional image R-CC of the right breast in the CC direction, a composite two-dimensional image R-MLO of the right breast in the MLO direction, a composite two-dimensional image L-CC of the left breast in the CC direction, and a composite two-dimensional image L-MLO of the left breast in the MLO direction are acquired. Therefore, the storage control unit 34 also transmits a plurality of tomographic images Dj for each of four types of composite two-dimensional images to the image storage system 3.

Figure 7:
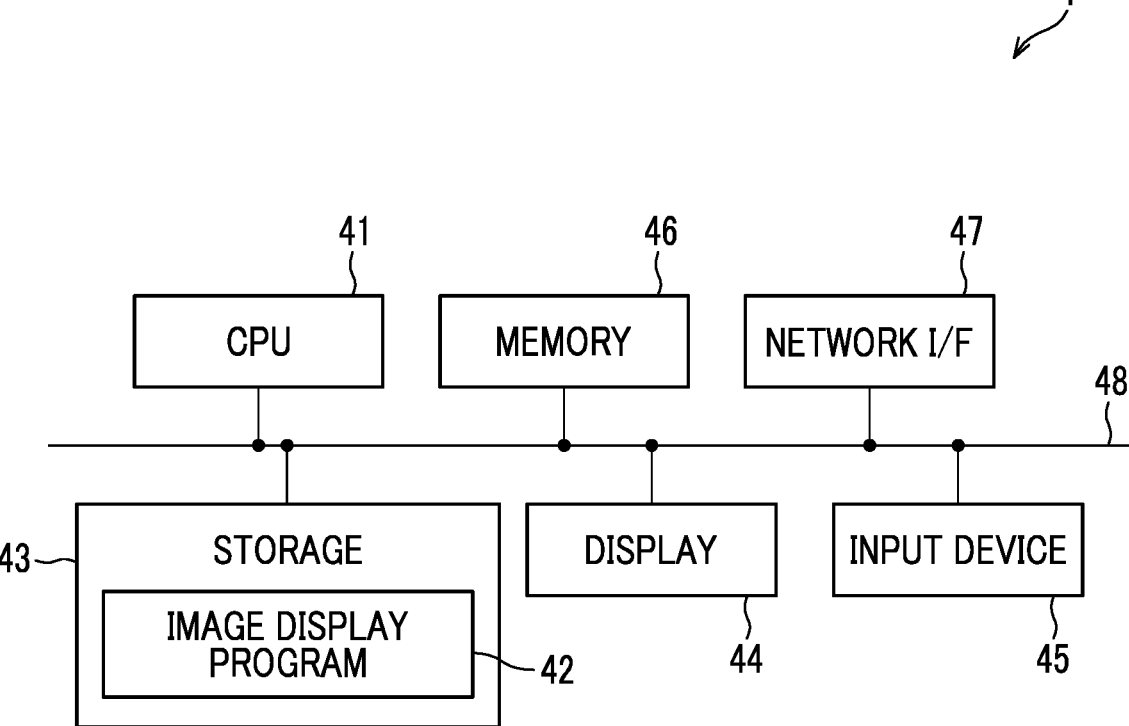
FIG. 7 is a diagram illustrating a schematic configuration of the image display device according to the first embodiment.

Next, an image display device according to the first embodiment will be described. First, a hardware configuration of the image display device 4 according to the first embodiment will be described with reference to FIG. 7. As illustrated in FIG. 7, the image display device 4 is a computer, such as a workstation or a personal computer, of a radiologist who interprets the image acquired by the mammography apparatus 1 and comprises a CPU 41, a non-volatile storage 43, and a memory 46 as a temporary storage area. In addition, the image display device 4 comprises a display 44, such as a liquid crystal display, an input device 45, such as a keyboard and a mouse, and a network I/F 47 that is connected to the network 5. The CPU 41, the storage 43, the display 44, the input device 45, the memory 46, and the network I/F 47 are connected to a bus 48. In addition, the CPU 41 is an example of the processor according to the present disclosure.

The storage 43 is implemented by, for example, an HDD, an SSD, and a flash memory. An image display program 42 installed in the computer constituting the image display device 4 is stored in the storage 43 as a storage medium. The CPU 41 reads the image display program 42 from the storage 43, expands the image display program 42 in the memory 46, and executes the expanded image display program 42.

In addition, the image display program 42 is stored in a storage device of a server computer connected to the network or a network storage in a state in which it can be accessed from the outside and is downloaded and installed in the computer constituting the image display device 4 as required. Alternatively, the image display program 42 is recorded on a recording medium, such as a DVD or a CD-ROM, distributed, and installed in the computer constituting the image display device 4 from the recording medium.

Figure 8:
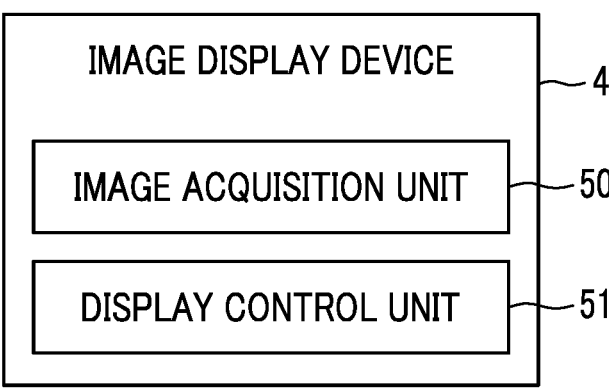
FIG. 8 is a diagram illustrating a functional configuration of the image display device according to the first embodiment.

Next, a functional configuration of the image display device according to the first embodiment will be described. FIG. 8 is a diagram illustrating the functional configuration of the image display device according to the first embodiment. As illustrated in FIG. 8, the image display device 4 comprises an image acquisition unit 50 and a display control unit 51. Then, the CPU 41 executes the image display program 42 such that the computer constituting the image display device 4 functions as the image acquisition unit 50 and the display control unit 51.

The image acquisition unit 50 acquires the composite two-dimensional image CG0 from the image storage system 3 through the network 5. Further, in this embodiment, it is assumed that the CC imaging and the ML0 imaging are performed on each of the left and right breasts of the patient and the composite two-dimensional image R-CC of the right breast in the CC direction, the composite two-dimensional image R-MLO of the right breast in the MLO direction, the composite two-dimensional image L-CC of the left breast in the CC direction, and the composite two-dimensional image L-MLO of the left breast in the MLO direction are acquired. In addition, in the following description, in a case in which the composite two-dimensional images R-CC, R-MLO, L-CC, and L-MLO are not distinguished from each other, CG0 is used as the reference numeral of the composite two-dimensional image.

The display control unit 51 displays a schema that schematically shows the breast B and the composite two-dimensional image on the display 44. In this case, the display control unit 51 displays the positions of the region of interest in the displayed schema and composite two-dimensional image CG0 in association with each other.

Figure 9:
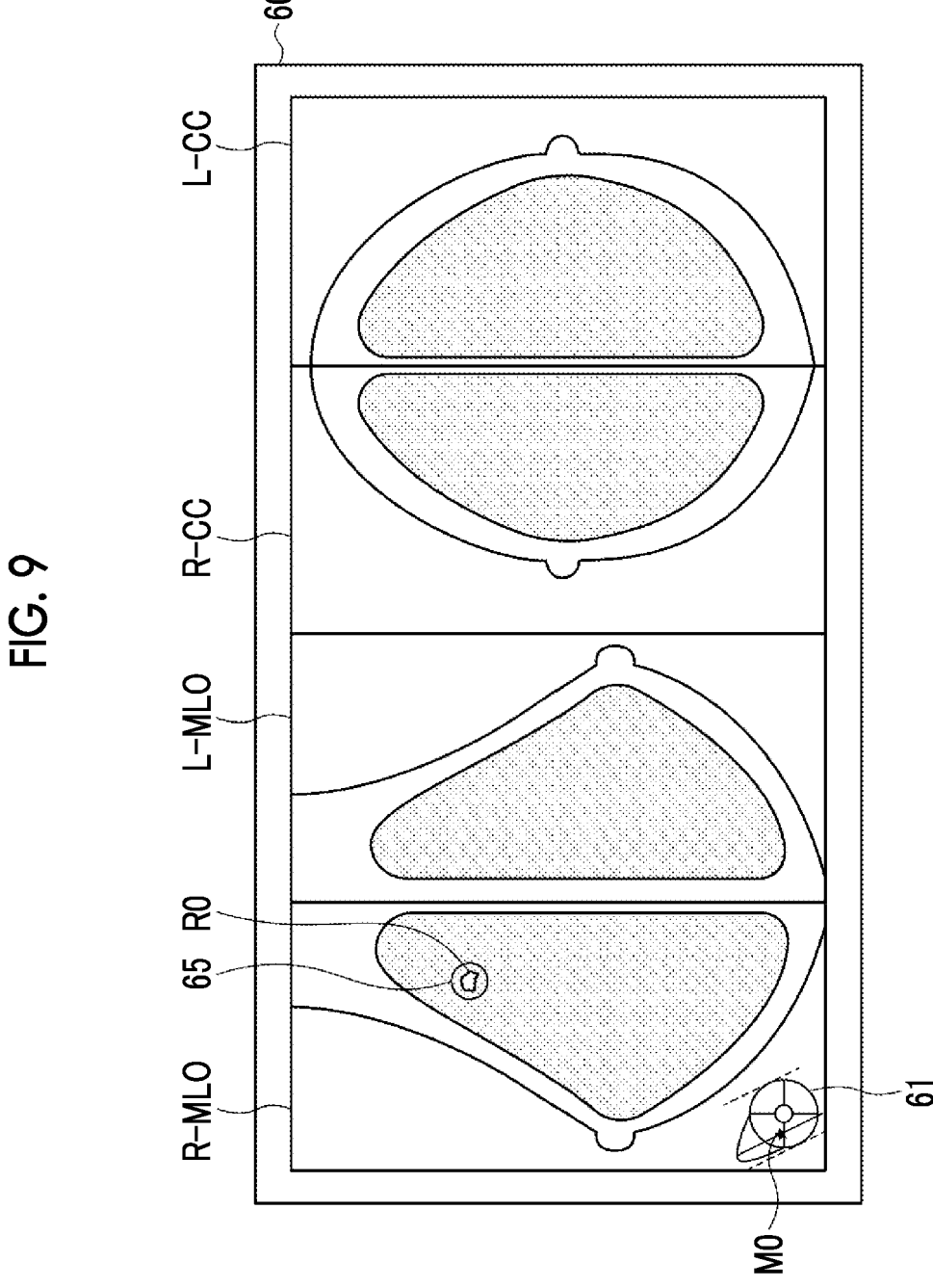
FIG. 9 is a diagram illustrating a display screen for a schema and a composite two-dimensional image in the first embodiment.

FIG. 9 is a diagram illustrating a display screen for the schema and the composite two-dimensional image. As illustrated in FIG. 9, the composite two-dimensional images R-MLO, L-MLO, R-CC, and L-CC are displayed on a display screen 60. Further, a schema 61 is displayed at a lower left corner of the composite two-dimensional image R-MLO. Furthermore, in the composite two-dimensional image R-MLO, the region of interest R0 is surrounded by a circular mark 65 to be highlighted.

Figure 10:
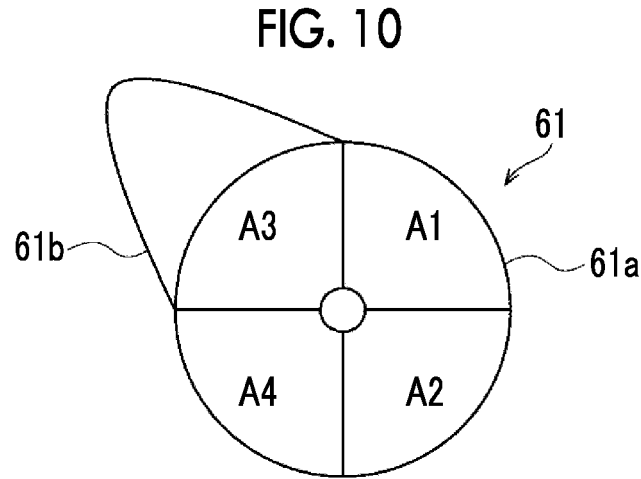
FIG. 10 is a diagram illustrating the schema.

FIG. 10 is a diagram illustrating the schema. As illustrated in FIG. 10, the schema 61 schematically shows the right breast as viewed from the front and has a circular breast region 61*a* and a substantially triangular axillary region 61*b* that indicates the axilla and extends obliquely upward from the breast region 61*a*. The breast region 61*a* is divided into four regions of an inner upper region A1, an inner lower region A2, an outer upper region A3, and an outer lower region A4 of the breast. The axillary region 61*b* is connected to a diagonal upper left portion of the outer upper region A3. In addition, the schema 61 illustrated in FIG. 10 is reversed in the left-right direction to obtain a schema that schematically shows the left breast.

Figure 11:
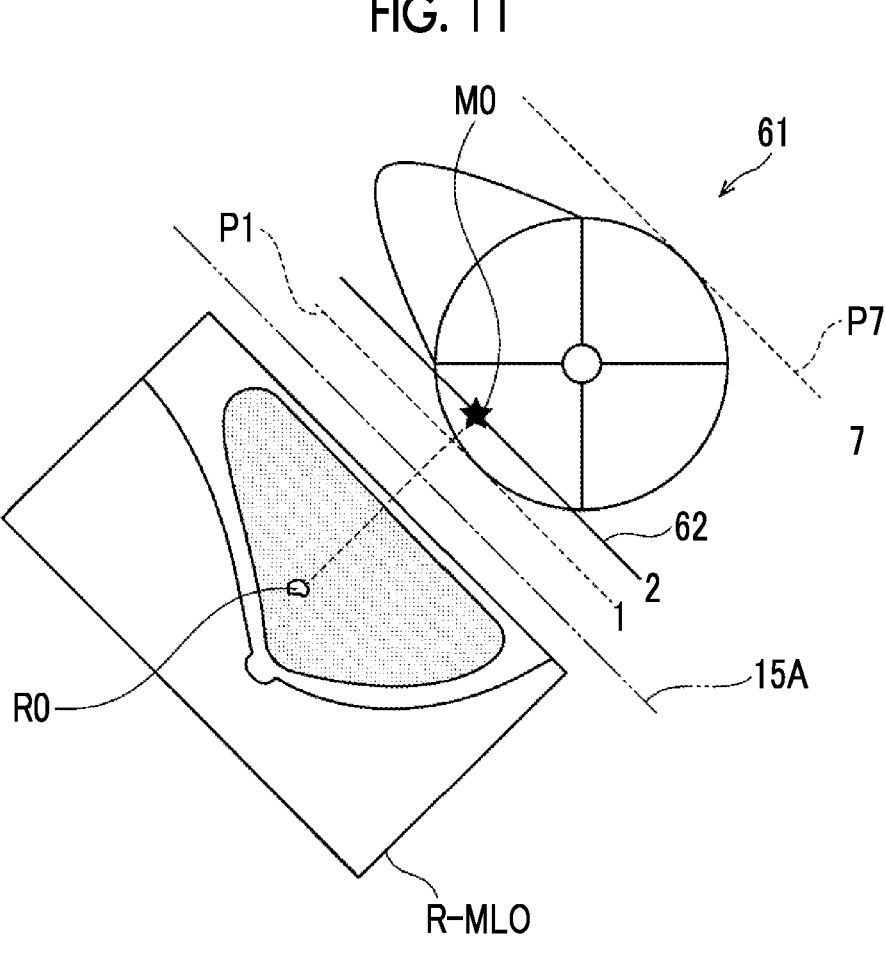
FIG. 11 is a diagram illustrating a relationship between a composite two-dimensional image and a schema in an MLO direction.

As illustrated in FIG. 11, a mark M0 that indicates the position of the region of interest R0 included in the composite two-dimensional image R-MLO is plotted on the schema 61, and a slice line 62 that indicates the tomographic image Dj best representing the region of interest R0 is drawn on the schema 61. The display control unit 51 generates the schema 61, on which the mark M0 indicating the region of interest R0 has been plotted and the slice line 62 has been drawn, with reference to the region-of-interest information, that is, the identification information of the region of interest R0, the position of the region of interest R0, the slice number of the tomographic image Dj best representing the region of interest R0, the imaging angle, and the like stored in the tag of the composite two-dimensional image CG0 or the DICOM-SR.

Here, in a case in which the information indicating the outer shape of the region of interest R0 is included in the region-of-interest information, the position of the center of gravity of the outer shape of the region of interest R0 can be used as the position of the region of interest R0. In a case in which the reference point of the region of interest R0 is included in the region-of-interest information, the reference point can be used as the position of the region of interest R0. In addition, a two-dot chain line indicating the detection surface 15A of the radiation detector 15 is illustrated in FIG. 11 in order to illustrate the imaging angle in the MLO imaging.

First, the display control unit 51 draws the slice line 62 on the schema 61 on the basis of the imaging angle and the slice number of the tomographic image Dj best representing the region of interest R0 which are stored in the tag of the composite two-dimensional image CG0 or the DICOM-SR. The slice line 62 has the same angle as the imaging angle in the MLO imaging and is drawn as a straight line extending parallel to the detection surface 15A of the radiation detector 15.

Figures 12, 13:
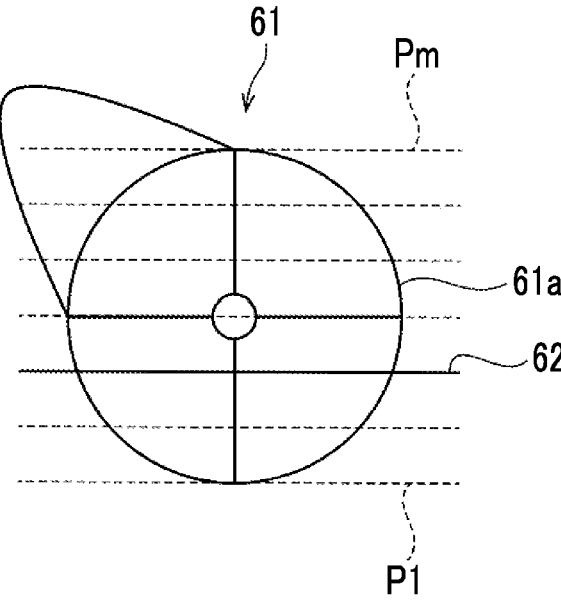
FIG. 12 is a diagram illustrating a schema in the MLO direction.
FIG. 13 is a diagram illustrating a schema in a CC direction.

For example, in a case in which the composite two-dimensional image CG0 is the composite two-dimensional image R-MLO of the right breast in the MLO direction, the imaging angle is, for example, about 60 degrees. Therefore, a slice plane by each of the tomographic images Dj extends in a direction that is inclined by about 60 degrees with respect to the horizontal direction. Therefore, as illustrated in FIG. 12, the display control unit 51 positions a slice plane P1 by the lower tomographic image D1 among the plurality of tomographic images Dj and a slice plane Pm by the upper tomographic image Dm among the plurality of tomographic images Dj, which are inclined according to the imaging angle, such that the circular breast region 61*a* is interposed therebetween and equally divides a region between the slice plane P1 and the slice plane Pm according to the number of tomographic images Dj. Then, the slice line 62 indicating the slice plane by the tomographic image Dj that best represents the region of interest R0 is drawn at a position corresponding to the slice number of the tomographic image Dj stored in the tag of the composite two-dimensional image R-MLO or the DICOM-SR from the slice plane P1 by the first tomographic image D1.

For example, assuming that the number of tomographic images Dj is 7 and the slice number of the tomographic image Dj that best represents the region of interest R0 is "2", the region between the slice plane P1 and the slice plane Pm is equally divided into six portions, and the slice line 62 is drawn at the position of the second slice plane corresponding to the slice number from the first slice plane P1 of the circular breast region 61*a*. In addition, the number of tomographic images Dj can be stored in the tag of the composite two-dimensional image CG0 or the DICOM-SR.

Further, instead of storing the number of tomographic images Dj in the tag of the composite two-dimensional image CG0 or the DICOM-SR, the number of tomographic images Dj generated may be calculated on the basis of the thickness of the breast compressed by the compression plate in a case in which a radiographic image is captured, a slice thickness, and a slice interval.

In addition, the slice planes may be set such that the first slice plane P1 is located on the upper side of the circular breast region 61*a* and the last slice plane Pm is located on the lower side of the circular breast region 61*a*.

In a case in which the slice line 62 is drawn in this manner, the display control unit 51 projects the region of interest R0 in the composite two-dimensional image R-MLO onto the slice line 62 in a state in which the composite two-dimensional image R-MLO and the schema 61 are positioned with each other. Therefore, the position of the region of interest R0 on the slice line 62 is specified. As illustrated in FIG. 11, the schema 61, on which the slice line 62 has been drawn and the mark M0 indicating the region of interest R0 has been plotted on the slice line 62, is generated. In addition, in FIG. 11, number 1 is given to the slice plane P1 located on the lower side, number 7 is given to the slice plane Pm (here, P7) located on the upper side, and number 2 is given to the slice line 62 of the tomographic image that best represents the region of interest. Therefore, it is possible to easily recognize the total number of tomographic images and the slice position of the tomographic plane that best represents and the region of interest R0.

The schema 61 illustrated in FIG. 11 corresponds to the composite two-dimensional image R-MLO of the right breast in the MLO direction. The schema 61 corresponding to the composite two-dimensional image R-CC of the right breast in the CC direction can also be generated in the same manner. In the composite two-dimensional image R-CC in the CC direction, the slice line 62 is horizontal. In this case, the schema 61 can be generated in the same manner as the schema 61 corresponding to the composite two-dimensional image R-MLO in the MLO direction.

That is, as illustrated in FIG. 13, it is assumed that the slice plane P1 by the first tomographic image D1 among the plurality of tomographic images Dj is located in the lower-most portion of the circular breast region 61a of the schema 61 and the slice plane Pm by the last tomographic image Dm among the plurality of tomographic images Dj is located in the uppermost portion of the circular breast region 61a. A region between the slice plane P1 and the slice plane Pm may be equally divided according to the number of tomo-graphic images Dj, and the slice line 62 may be drawn at a position corresponding to the slice number of the tomo-graphic image Dj stored in the tag of the composite two-dimensional image R-CC or the DICOM-SR.

Figures 14, 15:
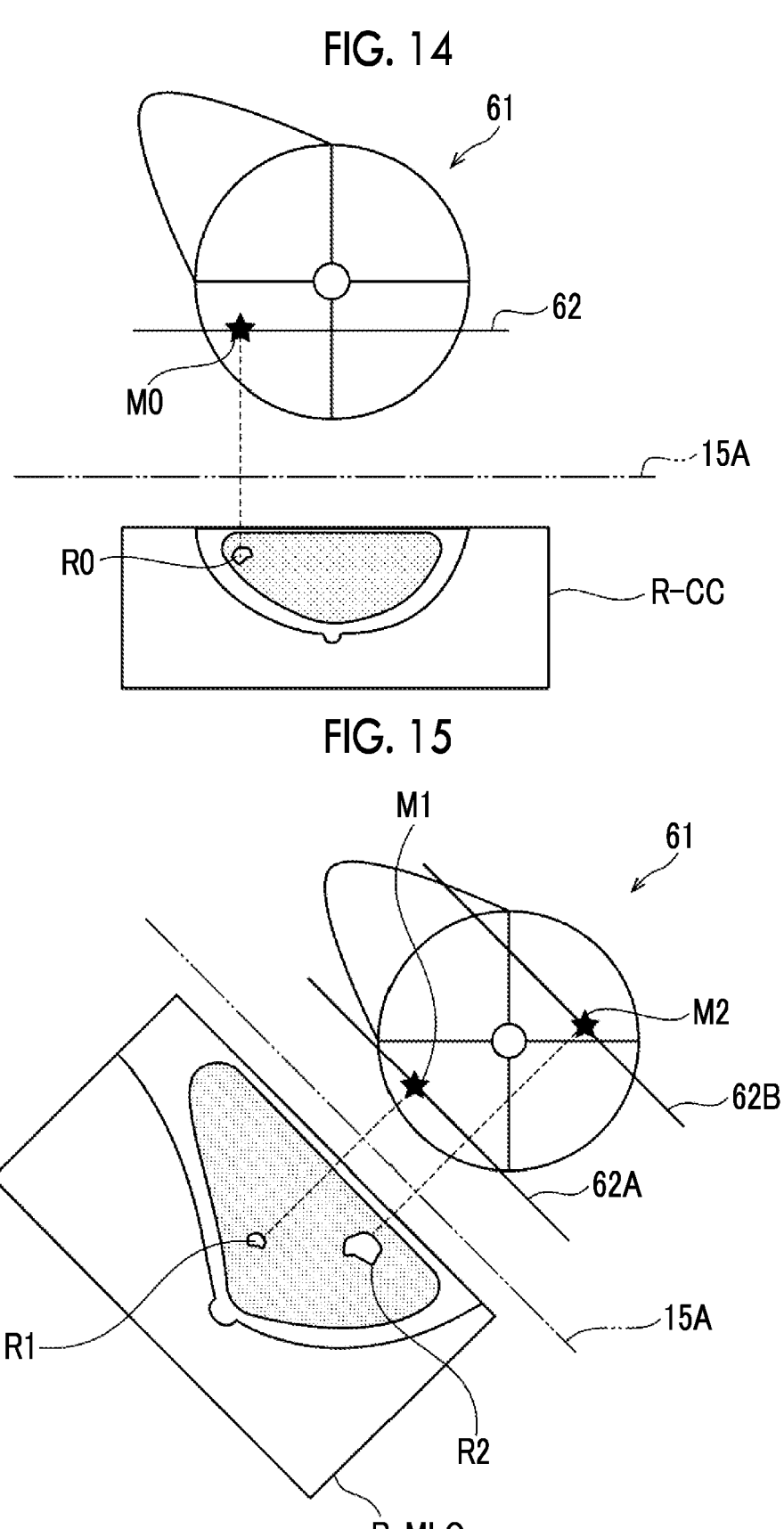
FIG. 14 is a diagram illustrating a relationship between a composite two-dimensional image and a schema in the CC direction.
FIG. 15 is a diagram illustrating a relationship between a composite two-dimensional image and a schema in the MLO direction in a case in which a plurality of regions of interest are included.

Further, the region of interest R0 in the composite two-dimensional image CG0 can be projected onto the slice line 62 to generate the schema 61 on which the slice line 62 has been drawn and the mark M0 indicating the region of interest R0 of interest has been plotted on the slice line 62 as illustrated in FIG. 14 and which corresponds to the composite two-dimensional image R-CC of the right breast in the CC direction.

Figures 16, 17:
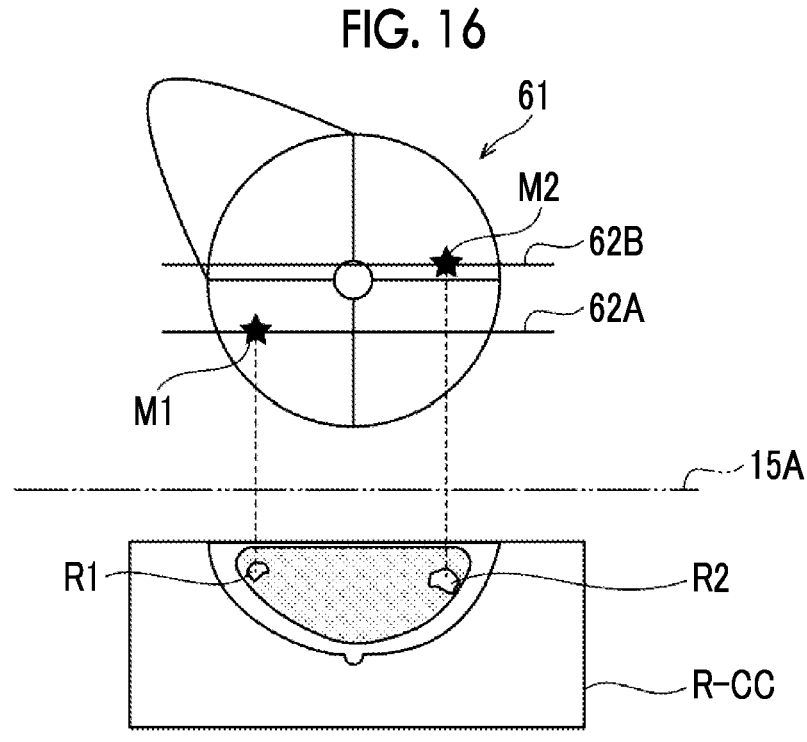
FIG. 16 is a diagram illustrating a relationship between a composite two-dimensional image in the CC direction and a schema in a case in which a plurality of regions of interest are included.
FIG. 17 is a diagram illustrating a menu for selecting the region of interest.

Furthermore, as illustrated in FIGS. 15 and 16, in a case in which the composite two-dimensional image CG0 has a plurality of regions of interest R1 and R2, schemas 61, on which slice lines 62A and 62B respectively corresponding to the plurality of regions of interest R1 and R2 have been drawn and marks M1 and M2 indicating the regions of interest R1 and R2 have been plotted on the slice lines 62A and 62B respectively, are generated. In addition, the schema 61 illustrated in FIG. 15 corresponds to the composite two-dimensional image R-MLO of the right breast in the MLO direction, and the schema 61 illustrated in FIG. 16 corresponds to the composite two-dimensional image R-CC of the right breast in the CC direction.

Further, a schema corresponding to the composite two-dimensional image L-CC of the left breast in the CC direction and a schema corresponding to the composite two-dimensional image L-MLO of the left breast in the MLO direction are left-right reversed with respect to the schemas 61 for the right breast and can be generated in the same manner as the schemas 61 for the right breast.

In addition, of the plurality of regions of interest R1 and R2, only the selected region of interest may be plotted on the schema 61. Alternatively, all of the regions of interest may be plotted on the schema 61. For example, the region of interest can be selected as follows. In a case in which the radiologist who is an operator right-clicks a region of the composite two-dimensional image on the display screen 60, a menu 64 for selecting the region of interest is displayed as illustrated in FIG. 17, and a desired region of interest selected from the displayed menu 64 by the radiologist is received. In addition, in FIG. 17, the menu 64 for selecting a tool, an annotation, a bookmark, a region of interest, and a utility is displayed by right-clicking. In a case in which a region of interest is selected in the menu 64, a submenu 64A for selecting the region of interest R1 and the region of interest R2 is displayed. The radiologist selects a desired region of interest from the submenu 64A.

Further, in FIG. 9, the plotting of the mark M0 indicating the region of interest on the schema 61 and the highlighting of the region of interest R0 in the composite two-dimensional image R-MLO are performed at the same time. However, the region of interest R0 may be highlighted in the composite two-dimensional image R-MLO by the reception of a click on the mark M0 indicating the region of interest R0 in the schema 61.

Figure 18:
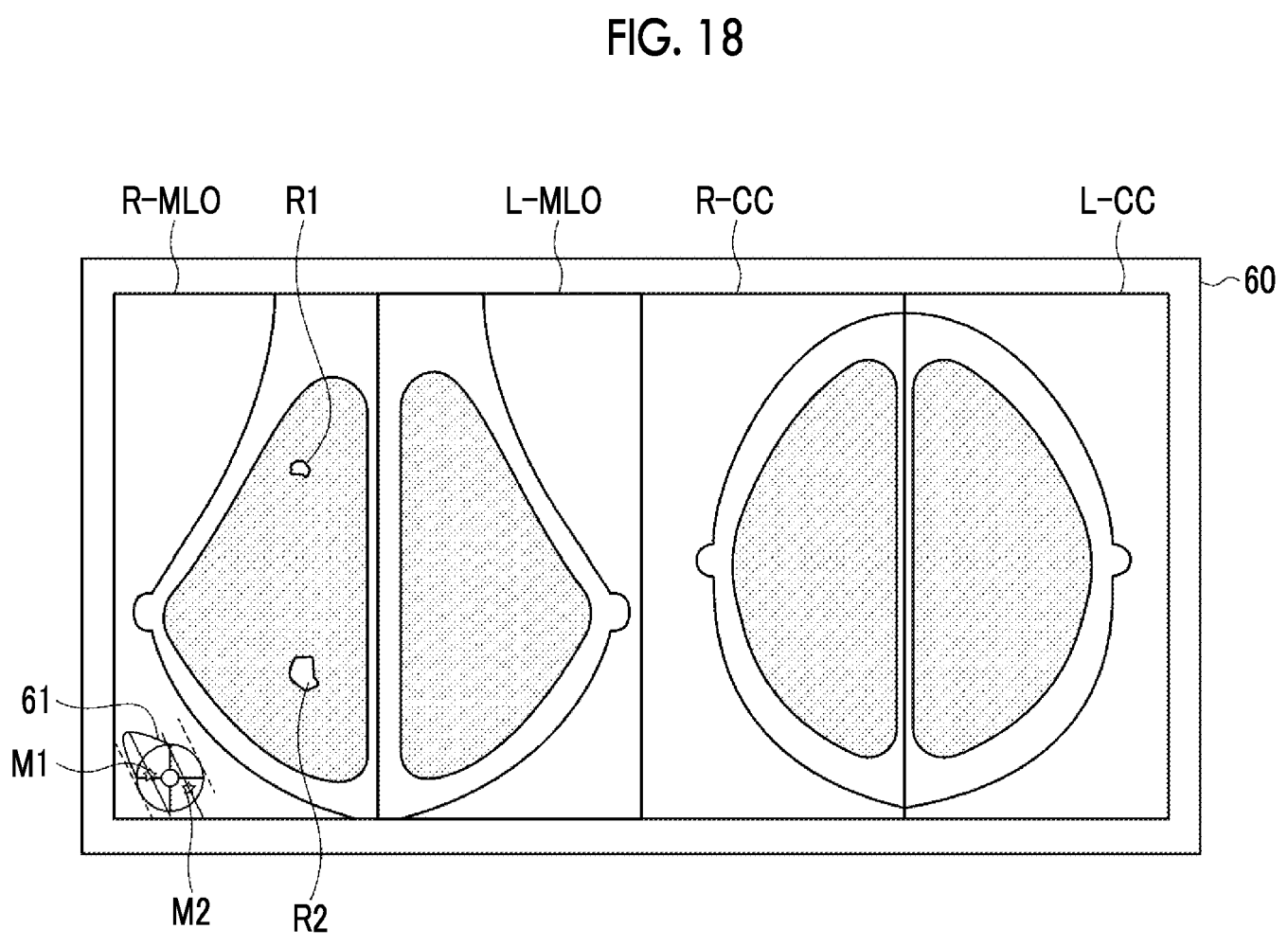
Figure 19:
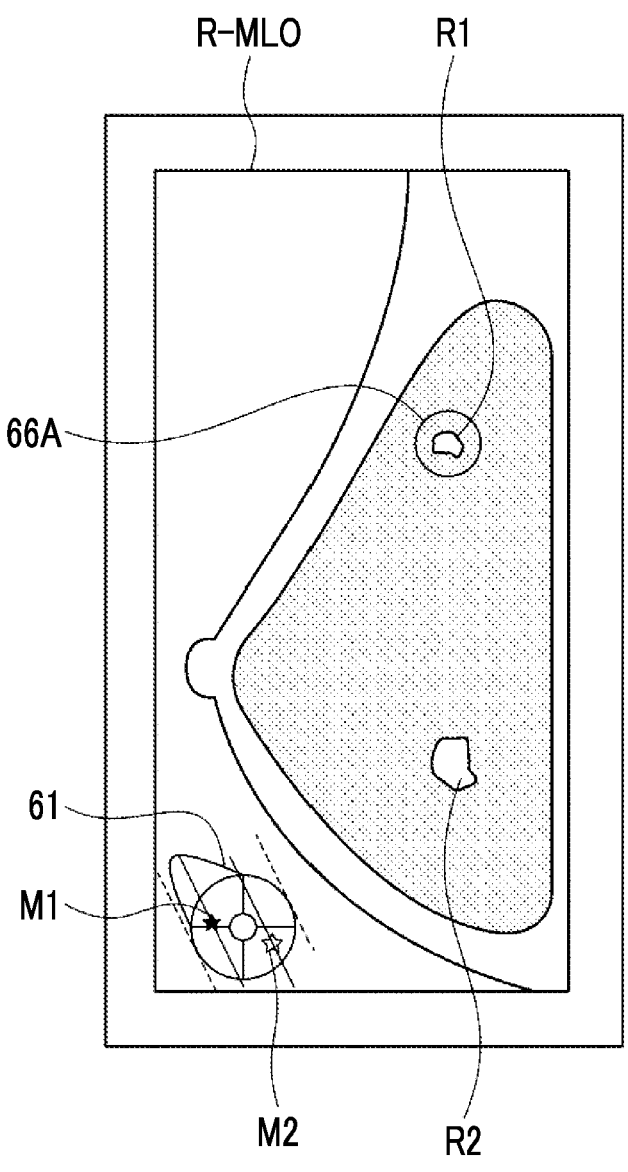
FIG. 19 is a diagram illustrating the display screen for a schema and a composite two-dimensional image in a case in which a plurality of regions of interest are included.
Figure 20:
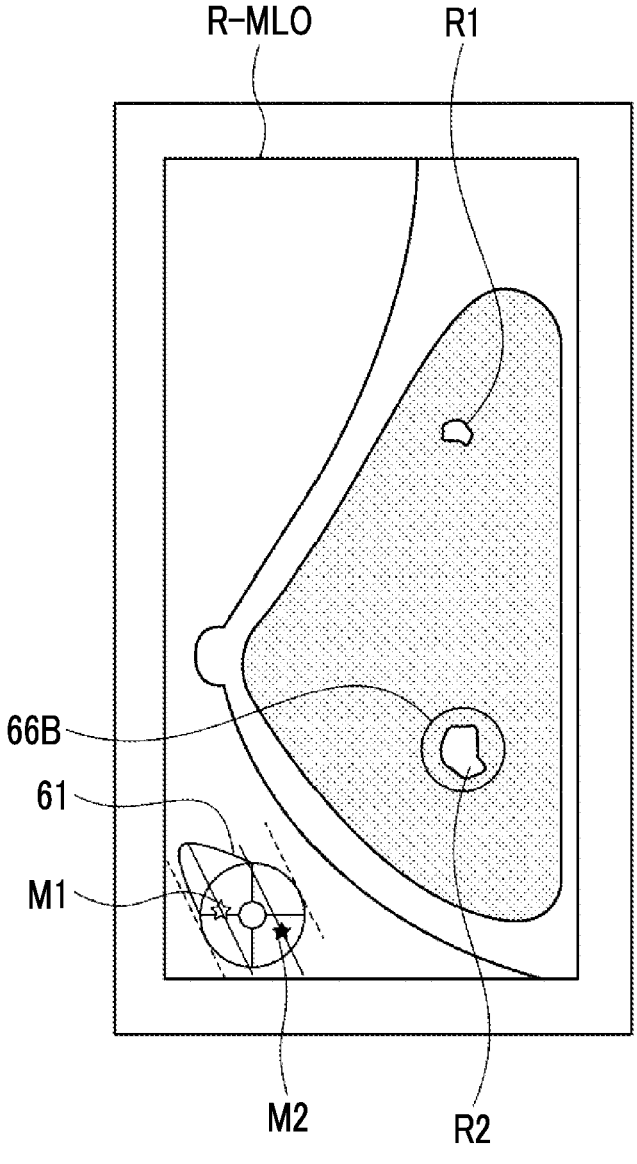
FIG. 20 is a diagram illustrating the display screen for a schema and a composite two-dimensional image in a case in which the plurality of regions of interest are included.

Furthermore, in a case in which the composite two-dimensional image R-MLO includes a plurality of regions of interest, as illustrated in FIG. 18, first, the marks M1 and M2 indicating the regions of interest may be plotted on the schema 61. Then, in a case in which one of the marks M1 and M2 is selected, the region of interest corresponding to the selected mark may be highlighted in the composite two-dimensional image R-MLO. For example, in a case in which the mark M1 is selected, only the region of interest R1 may be surrounded by a circular mark 66A to be highlighted as illustrated in FIG. 19. In a case in which the mark M2 is selected, only the region of interest R2 may be surrounded by a circular mark 66B to be highlighted as illustrated in FIG. 20. In addition, in the schema 61 illustrated in FIGS. 19 and 20, the selected mark is painted black, and the non-selected mark is painted white.

Figure 21:
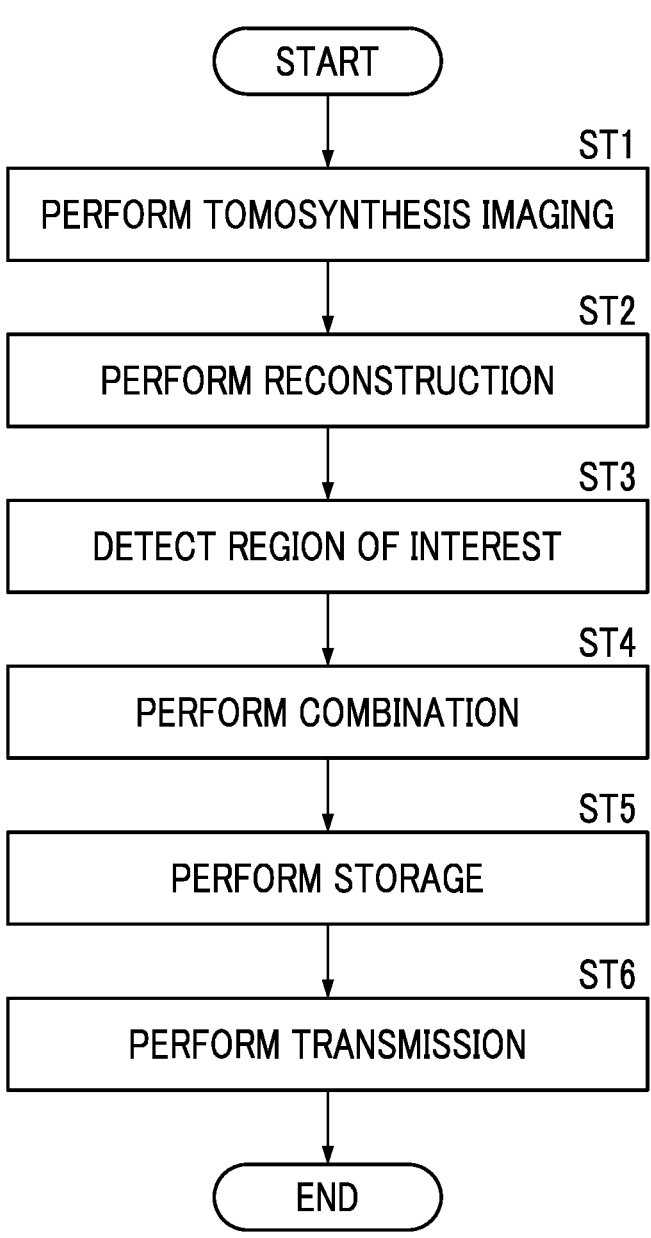
FIG. 21 is a flowchart illustrating a process performed by the image processing device in the first embodiment.

Next, a process performed in the first embodiment will be described. FIG. 21 is a flowchart illustrating a process performed by the console 2 in the first embodiment. First, the process is started in response to an imaging start instruc-tion, and the image acquisition unit 30 directs the mammog-raphy apparatus 1 to perform the tomosynthesis imaging and acquires a plurality of projection images (Step ST1). Then, the reconstruction unit 31 reconstructs the plurality of pro-jection images Gi to derive a plurality of tomographic images Dj (Step ST2). Then, the region-of-interest detection unit 32 detects the region of interest from the plurality of tomographic images Dj (Step ST3). The combination unit 33 generates the composite two-dimensional image CG0 from the plurality of tomographic images Dj (Step ST4).

Then, the storage control unit 34 stores the composite two-dimensional image CG0 and the region-of-interest information including the information of the tomographic image corresponding to the region of interest on the com-posite two-dimensional image CG0 in association with each other (Step ST5). In addition, the storage control unit 34 transmits the plurality of tomographic images Dj and the composite two-dimensional image CG0 associated with the region-of-interest information to the image storage system 3 (Step ST6). Then, the process ends. In addition, in the process in Step ST3, the region of interest may not be detected from the plurality of tomographic images Dj. In this case, in this embodiment, the combination unit 33 generates the composite two-dimensional image CG0 from the plurality of tomographic images Dj, and the storage control unit 34 transmits the composite two-dimensional image CG0 to the image storage system 3. Then, the process ends.

Figure 22:
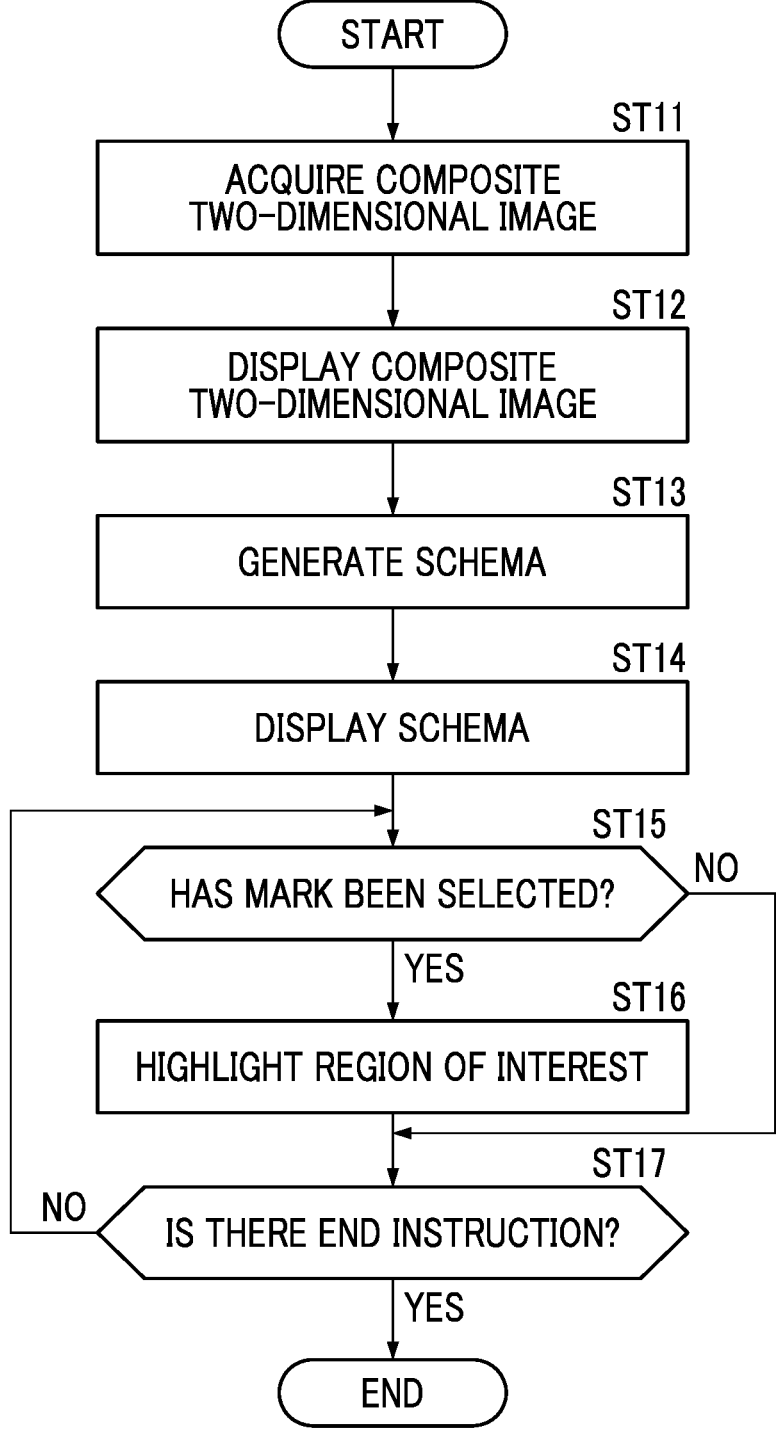
FIG. 22 is a flowchart illustrating a process performed by the image display device in the first embodiment.

FIG. 22 is a flowchart illustrating a process performed by the image display device 4 in the first embodiment. In a case in which a process start instruction is input, the image acquisition unit 50 acquires the composite two-dimensional image CG0 of a designated patient from the image storage system 3 (Step ST11). In addition, here, it is assumed that the composite two-dimensional image CG0 includes a plurality of regions of interest. Further, it is assumed that the composite two-dimensional image CG0 includes the images of each of the left and right breasts in the CC direction and in the MLO direction.

Then, the display control unit 51 displays four types of composite two-dimensional images R-MLO, L-MLO, R-CC, and L-CC on the display 44 (Step ST12). In addition, the display control unit 51 generates the schema 61 (Step ST13). Specifically, the region-of-interest information including, for example, the identification information of the regions of interest included in the composite two-dimensional images R-MLO, L-MLO, R-CC, and L-CC, the positions of the regions of interest, the slice numbers of the tomographic images Dj that best represent the regions of interest, and the imaging angles are acquired from the tags of the composite two-dimensional images R-MLO, L-MLO, R-CC, L-CC or the DICOM-SR, and the schema 61, on which the slice lines 62A and 62B have been drawn and the marks M1 and M2 indicating the regions of interest R1 and R2 have been plotted on the slice lines 62A and 62B, respectively, is generated. Then, the display control unit 51 displays the generated schema 61 on the corresponding composite two-dimensional images R-MLO, L-MLO, R-CC, and L-CC on the display 44 (Step ST14).

Then, the display control unit 51 determines whether or not any of the marks M1 and M2 indicating the regions of interest R1 and R2 displayed on the schema 61 has been selected (Step ST15). In a case in which the determination result in Step ST15 is "Yes", the display control unit 51 highlights the region of interest corresponding to the selected mark in the composite two-dimensional images R-MLO, L-MLO, R-CC, and L-CC (Step ST16). In a case in which the determination result in Step ST15 is "No", it is determined whether or not an end instruction has been issued, subsequent to Step ST16 (Step ST17). In a case in which the determination result in Step ST17 is "No", the process returns to Step ST15. The process from Step ST15 to Step ST17 is repeated. In a case in which the determination result in Step ST17 is "Yes", the process ends.

As described above, in the first embodiment, the composite two-dimensional image CG0 and the region-of-interest information including the information of the tomographic image corresponding to the region of interest on the composite two-dimensional image CG0 are stored in association with each other. Therefore, the reference to the composite two-dimensional image CG0 and the region-of-interest information makes it possible to check the region of interest using only the composite two-dimensional image CG0.

In addition, in the first embodiment, the schema 61 schematically showing the breast and the composite two-dimensional image CG0 are displayed, and the positions of the region of interest in the displayed schema 61 and composite two-dimensional image CG0 are displayed to be associated with each other. Therefore, the schema 61 makes it possible to check which portion of the breast includes the region of interest. Further, the reference to the composite two-dimensional image CG0 makes it possible to check the state of the region of interest in the schema 61 without referring to the plurality of tomographic images Dj. Therefore, according to the first embodiment, it is possible to reduce the burden on the radiologist who interprets the image acquired by mammography.

In addition, in the first embodiment, in a case in which the composite two-dimensional image CG0 includes a plurality of regions of interest R1 and R2, the marks M1 and M2 respectively indicating the plurality of regions of interest R1 and R2 are displayed on the schema 61. In this case, the region of interest corresponding to the selected mark is highlighted in the composite two-dimensional image CG0. Therefore, even in a case in which a plurality of regions of interest are included in the composite two-dimensional image CG0, it is possible to easily check the correspondence between the position of the region of interest in the schema 61 and the region of interest in the composite two-dimensional image CG0.

Further, the slice lines 62 indicating a plurality of tomographic images are displayed on the schema 61, which makes it possible to easily check which slice plane of the breast B the region of interest is present in.

Furthermore, in the first embodiment, the schema 61 is displayed only on the composite two-dimensional image R-MLO of the right breast. However, the schema 61 may be displayed on the other composite two-dimensional images L-MLO, R-CC, and L-CC at the same time. In this case, the schema 61 may be displayed regardless of the presence or absence of the region of interest. Alternatively, the schema 61 may be displayed only on the composite two-dimensional image including the region of interest.

Next, a second embodiment of the image display device according to the present disclosure will be described. In addition, a configuration of an image display device according to the second embodiment is the same as the configuration of the image display device 4 according to the first embodiment except only the process to be performed. Therefore, the detailed description of the device will not be repeated here. The second embodiment differs from the first embodiment in that, in a case in which at least one of a mark plotting position in the schema 61 or the size of the region of interest is the same for the composite two-dimensional image in the CC direction and the composite two-dimensional image in the MLO direction for the same breast (the left breast or the right breast), the regions of interest are considered to be the same and are highlighted in both the image in the CC direction and the image in the MLO direction.

Figure 23:
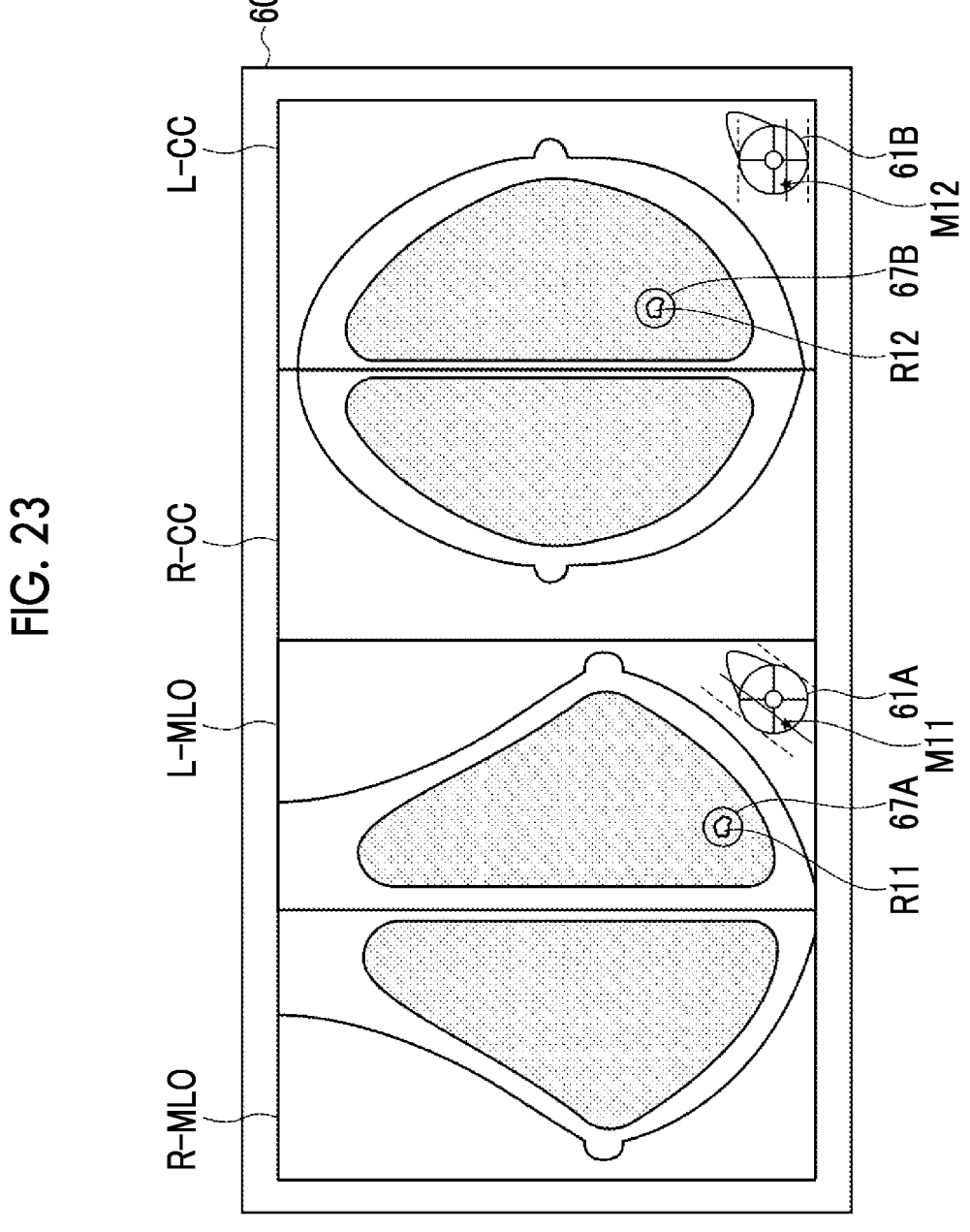
FIG. 23 is a diagram illustrating a display screen for a schema and a composite two-dimensional image in a second embodiment.

FIG. 23 is a diagram illustrating a display screen for a schema and a composite two-dimensional image in the second embodiment. As illustrated in FIG. 23, schemas 61A and 61B are displayed on the composite two-dimensional images L-MLO and L-CC of the left breast, respectively, and marks M11 and M12 indicating the regions of interest included in the left breast are displayed on the schemas 61A and 61B together with slice lines, respectively. In addition, a region of interest R11 included in the composite two-dimensional image L-MLO and a region of interest R12 included in the composite two-dimensional image L-CC have substantially the same size. Further, the position of the mark M11 indicating the region of interest R11 in the schema 61A and the position of the mark M12 indicating the region of interest R12 in the schema 61B are substantially the same. Therefore, the display control unit 51 determines that the region of interest R11 and the region of interest R12 are the same and surrounds the regions of interest R11 and R12 with marks 67A and 67B having the same circular shape, respectively, to highlight the regions of interest R11 and R12. In addition, even in a case in which the positions and sizes of the region of interest R11 and the region of interest R12 are the same, the types of the regions of interest may be different from each other. For example, the region of interest R11 is a tumor, and the region of interest R12 is a calcification. In this case, even though the positions and sizes of the region of interest R11 and the region of interest R12 are the same, the display control unit 51 determines that the region of interest R11 and the region of interest R12 are not the same.

As described above, the regions of interest, which are considered to be the same in both the image in the CC direction and the image in the MLO direction, are highlighted. Therefore, it is possible to interpret the regions of interest in each of the images in association with each other.

In addition, in a case in which a plurality of regions of interest are included in each of the image in the CC direction and the image in the MLO direction, there is a high probability that the regions of interest having the same position or the same size will be the same region of interest. Therefore, in a case in which the regions of interest are highlighted, it is preferable that marks having the same shape or marks having the same color are given to the regions of interest having at least one of the same position or the same size such that it can be seen that the regions of interest are the same region of interest. Further, in the case of multiple lesions, a plurality of regions of interest having similar sizes may be present at close positions. In this case, it is preferable to give marks to all of the regions of interest such that the radiologist determines the correspondence relationship between the regions of interest in each of the image in the CC direction and the image in the MLO direction.

Figure 24:
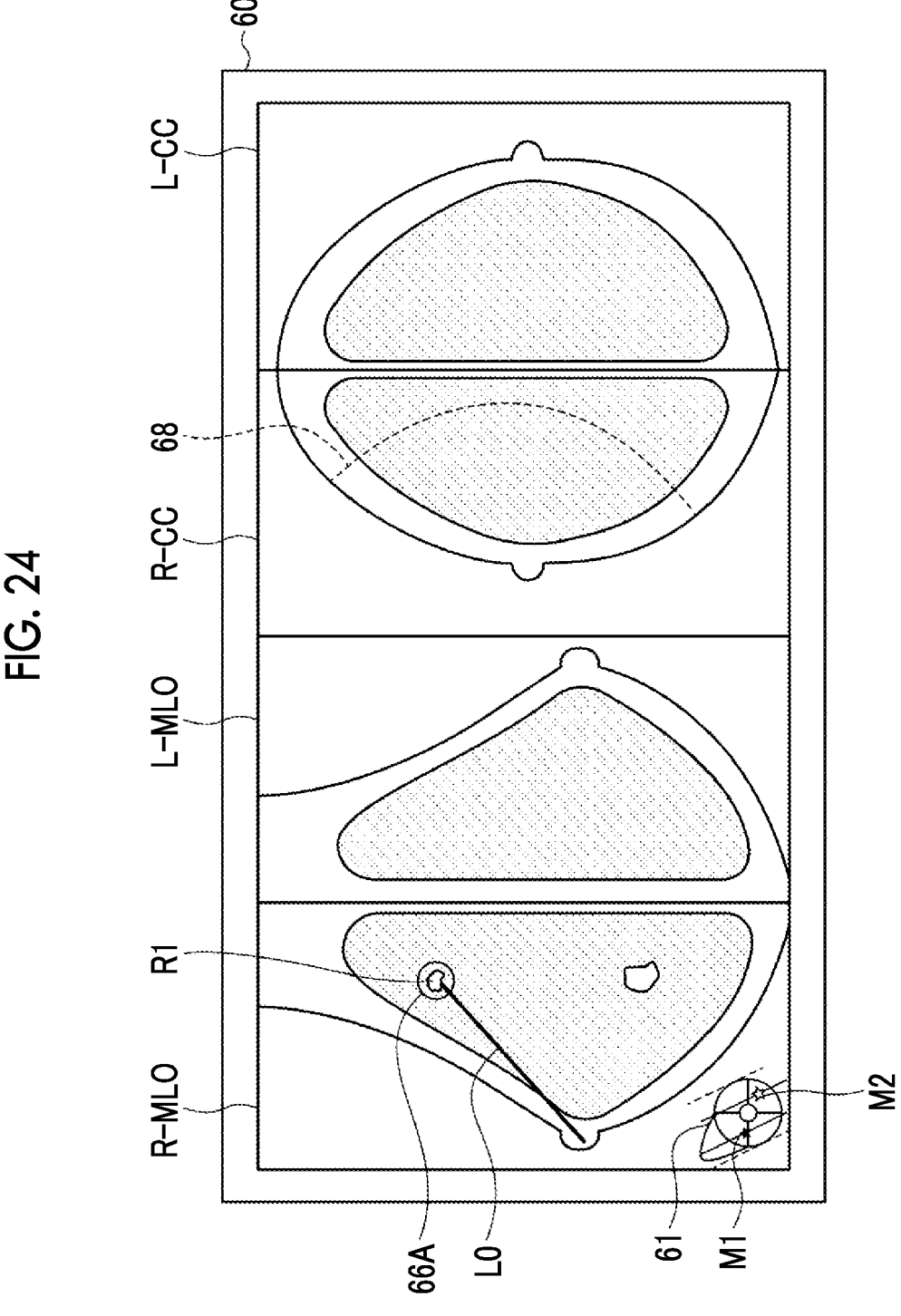
FIG. 24 is a diagram illustrating a display screen for a schema and a composite two-dimensional image in a third embodiment.

Next, a third embodiment of the image display device according to the present disclosure will be described. In addition, a configuration of an image display device according to the third embodiment is the same as the configuration of the image display device 4 according to the first embodiment except only the process to be performed. Therefore, the detailed description of the device will not be repeated here. Here, in a case in which the region of interest is included in one of the composite two-dimensional image in the CC direction and the composite two-dimensional image in the MLO direction for the same breast (the left breast or the right breast), the distance from a reference point (for example, the nipple) of the breast to the region of interest in the composite two-dimensional image is substantially the same even in the images captured in different directions. Therefore, as illustrated in FIG. 24, in a case in which the mark M1 is selected in the schema 61 of the composite two-dimensional image R-MLO of the right breast, the display control unit 51 measures a distance L0 from the nipple of the region of interest R1 corresponding to the mark M1 in the composite two-dimensional image R-MLO. Then, the display control unit 51 draws an arc 68 having the distance L0 from the nipple in the composite two-dimensional image R-CC. In addition, the arc 68 may be displayed only while the mark M1 in the schema 61 is being clicked and may not be displayed in a case in which the click is ended. Further, the arc 68 is an example of an index indicating the same distance.

In a case in which the arc 68 is drawn as described above, the radiologist who is an operator can perform interpretation with emphasis on the periphery of the arc 68 in the composite two-dimensional image R-CC. As a result, it is easy to find the region of interest. Therefore, it is possible to interpret images with higher efficiency.

Next, a fourth embodiment of the image display device according to the present disclosure will be described. In addition, a configuration of an image display device according to the fourth embodiment is the same as the configuration of the image display device 4 according to the first embodiment except that the image display device comprises a plurality of displays. Therefore, the detailed description thereof will not be repeated here. The fourth embodiment differs from the first embodiment in that a composite two-dimensional image display screen is displayed on one display and a report creation screen for creating an interpretation report is displayed on another display.

Figure 25:
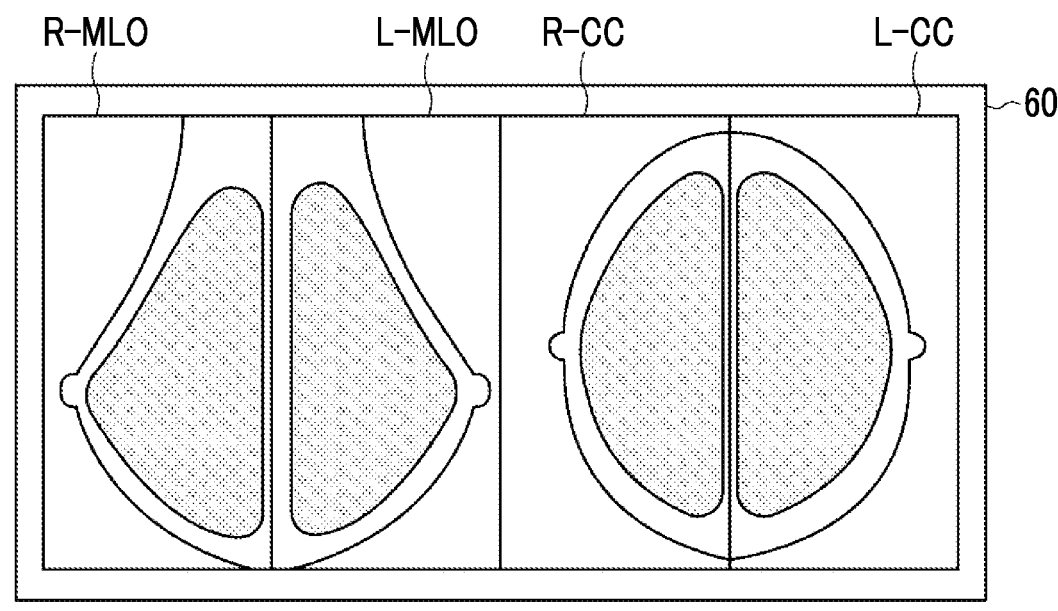
FIG. 25 is a diagram illustrating a display screen for a schema and a composite two-dimensional image in a fourth embodiment.
Figure 25:
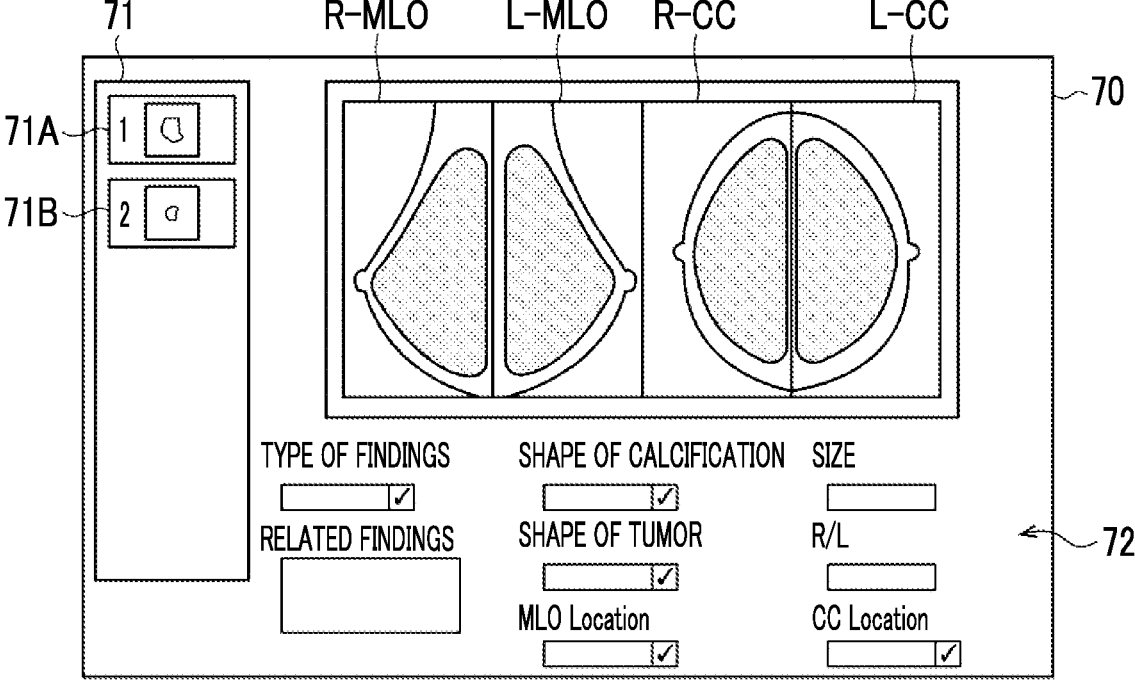

FIG. 25 is a diagram illustrating the composite two-dimensional image display screen and the report creation screen in the fourth embodiment. In addition, since a composite two-dimensional image display screen 60 in FIG. 25 is the same as the display screen 60 in the first embodiment, the detailed description thereof will not be repeated here. As illustrated in FIG. 25, a report creation screen 70 includes a list 71 of the detected regions of interest and a findings region 72 in which the composite two-dimensional images R-MLO, L-MLO, R-CC, and L-CC and the regions of interest are displayed.

In the list 71 of the regions of interest, icons corresponding to all of the regions of interest included in the composite two-dimensional images are displayed. In FIG. 25, two icons 71A and 71B are displayed. In addition, the design of the icon differs depending on the type of the region of interest. For example, in FIG. 25, the icon 71A has a design indicating a tumor, and the icon 71B has a design indicating a calcification.

Various types of information included in the region-of-interest information associated with the composite two-dimensional image are displayed in the findings region 72. In FIG. 25, the type of findings, the shape of a calcification, the shape of a tumor, a size, a location, the location of the region of interest in the MLO image (MLO Location), and the location of the region of interest in the CC image (CC Location) are displayed. For example, a tumor, a calcification, and architectural disorder are displayed as the type of findings. For example, a coarse shape and an eggshell shape are displayed as the shape of the calcification. For example, a circular shape and a polygonal shape are displayed as the shape of the tumor. For example, the upper side of the breast, the periphery of the nipple, and the periphery of the pectoralis major are displayed as the location of the region of interest. In addition, at least a portion of the information is transcribed from the region-of-interest information. However, the radiologist can select a pull-down menu in each information item to correct the information. Further, a field to which the radiologist inputs the related findings is displayed in the findings region 72, and the radiologist can freely input the findings to the field.

Figure 26:
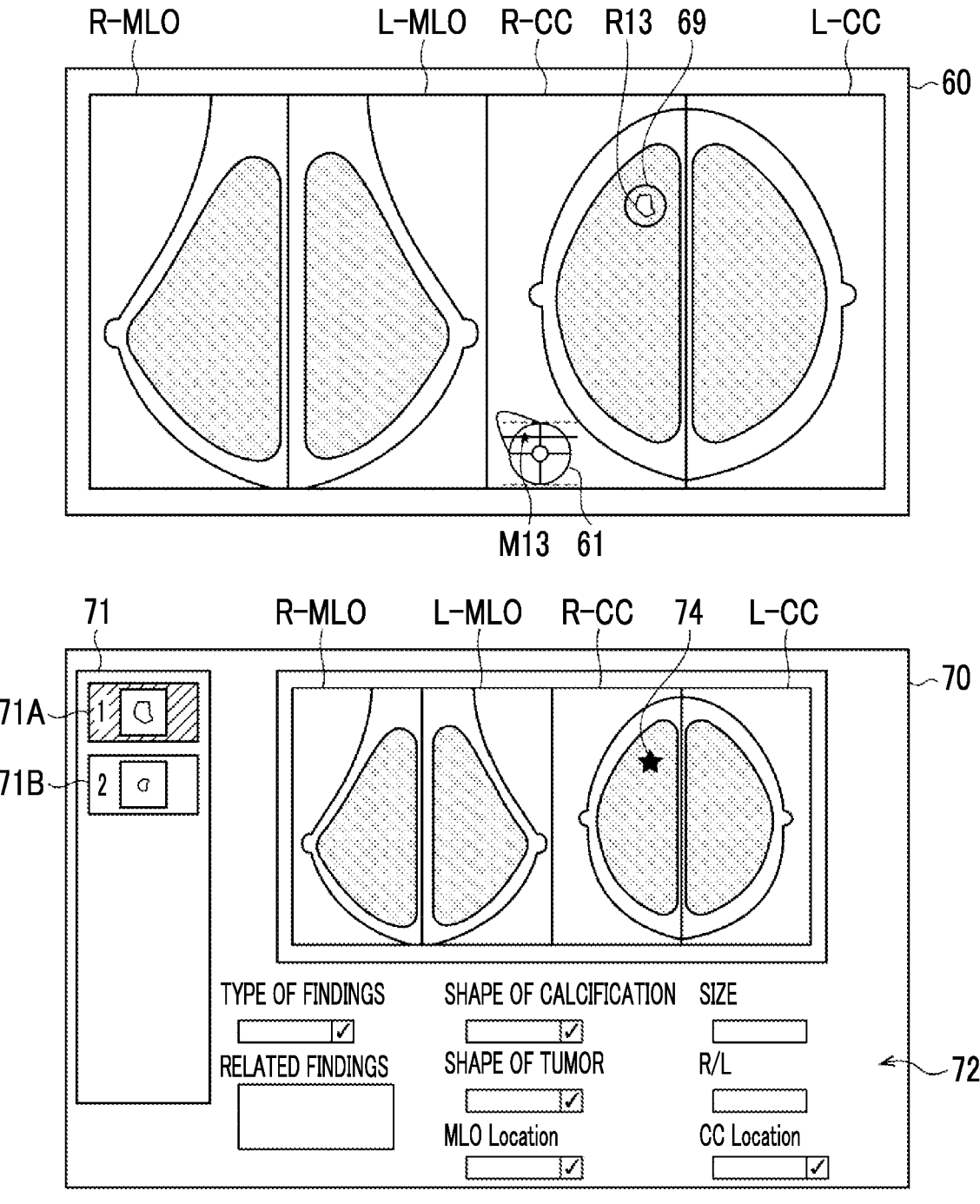
FIG. 26 is a diagram illustrating the display screen for a schema and a composite two-dimensional image in the fourth embodiment.

The radiologist can select an icon indicating the desired region of interest from the list 71 of the regions of interest on the report creation screen 70. For example, in a case in which the radiologist selects the icon 71A, a mark 74 indicating the position of the region of interest is displayed on the composite two-dimensional image R-CC of the right breast on the report creation screen 70 as illustrated in FIG. 26. Further, in synchronization with this display, the schema 61 is displayed on the composite two-dimensional image R-CC of the right breast on the composite two-dimensional image display screen 60, and a mark M13 indicating the region of interest is plotted on the schema 61. In addition, a circular mark 69 is given to the region of interest R13 included in the composite two-dimensional image R-CC such that the region of interest R13 is highlighted.

Figure 27:
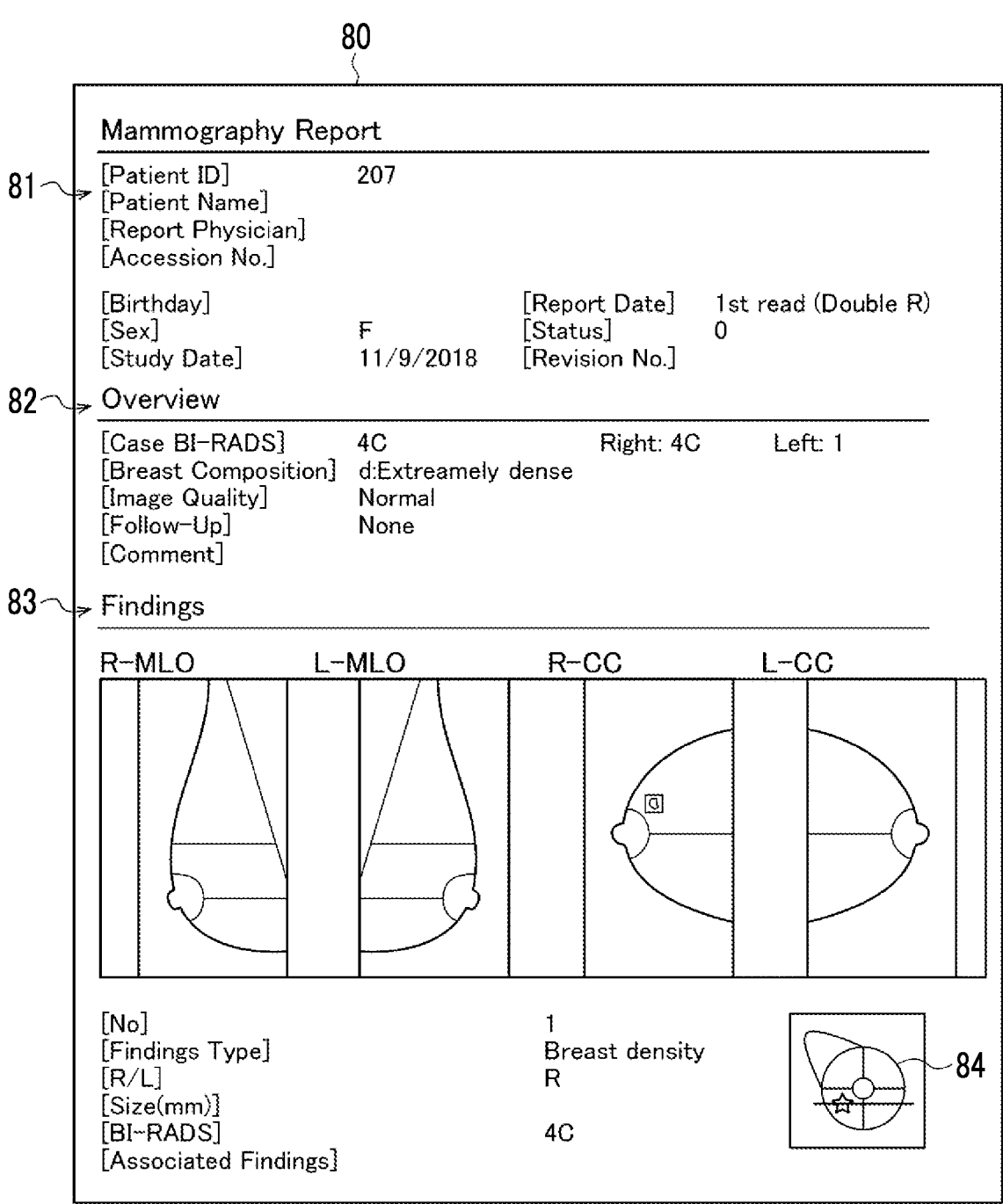
FIG. 27 is a diagram illustrating an interpretation report.

Further, in the fourth embodiment, the interpretation report can be created on the report creation screen 70. However, the schema may be described in the interpretation report. FIG. 27 is a diagram illustrating an example of the interpretation report in which the schema is described. As illustrated in FIG. 27, an interpretation report 80 includes patient information 81, an overview 82, and findings 83. The findings 83 include the schematic images of the left and right breasts in the CC direction and in the MLO direction. In addition, findings about the region of interest included in the breast are described in the findings 83. Further, the findings 83 include a schema 84 in which a mark indicating the region of interest is given.

As described above, the inclusion of the schema 84 in the interpretation report 80 makes it possible for the doctor, who has seen the interpretation report 80, to refer to the schema 84. Therefore, it is possible to easily recognize which tomographic plane of the breast includes the region of interest.

Next, a fifth embodiment of the present disclosure will be described. In addition, a configuration of an image display device according to the fifth embodiment is the same as the configuration of the image display device 4 according to the first embodiment except only the process to be performed. Therefore, the detailed description of the device will not be repeated here. In the first embodiment, in a case in which the mark indicating the region of interest is selected in the schema 61, the region of interest included in the composite two-dimensional image is highlighted. The fifth embodiment differs from the first embodiment in that, in a case in which a position is selected in the composite two-dimensional image and the selected position is in the region of interest, a mark indicating the region of interest is plotted on the schema to highlight the region of interest.

Figure 28:
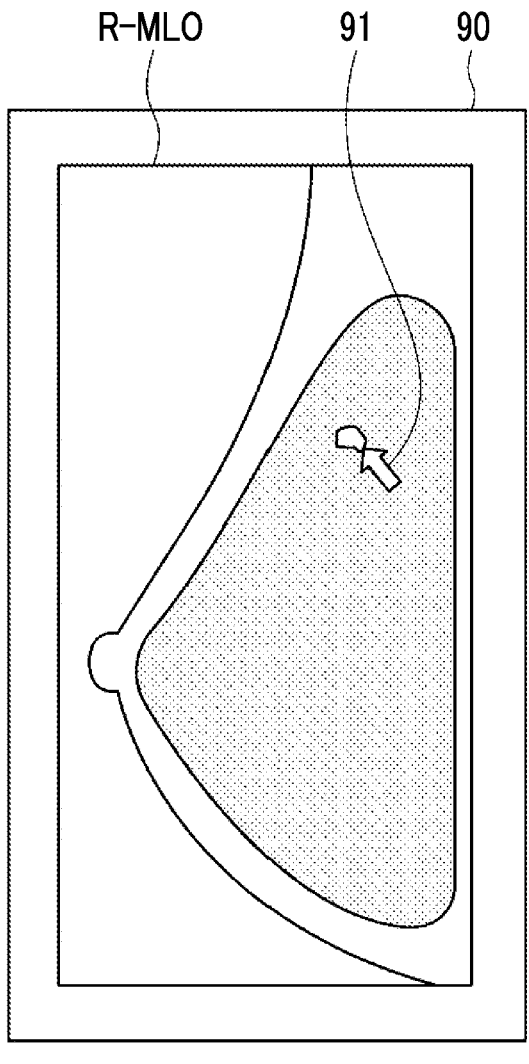
FIG. 28 is a diagram illustrating a display screen for a schema and a composite two-dimensional image in a fifth embodiment.
Figure 29:
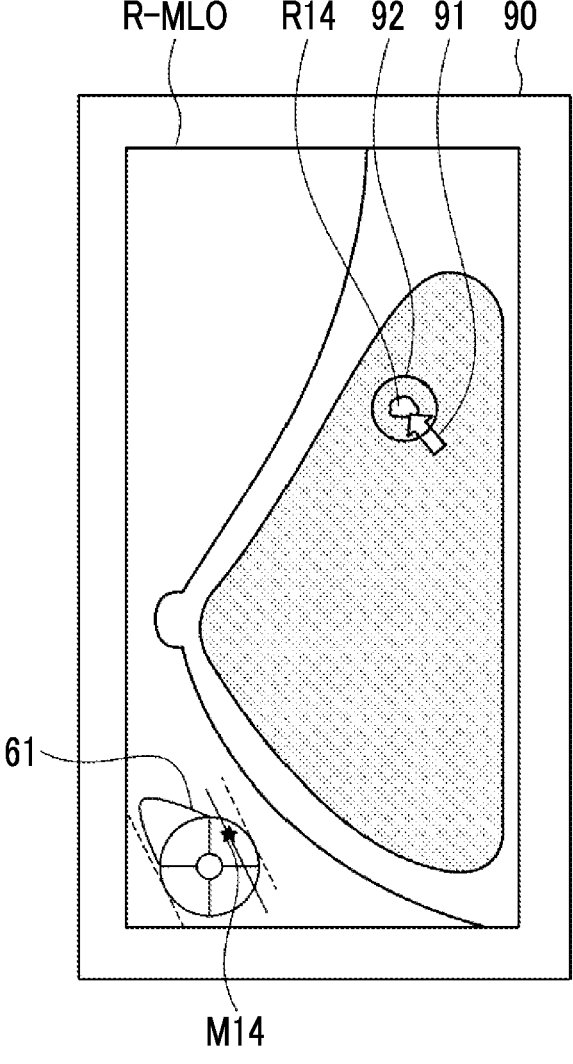
FIG. 29 is a diagram illustrating the display screen for a schema and a composite two-dimensional image in the fifth embodiment.

FIG. 28 is a diagram illustrating a composite two-dimensional image display screen in the fifth embodiment. In addition, only the composite two-dimensional image R-MLO is displayed in FIG. 28. However, the other composite two-dimensional images R-CC, L-CC, and L-MLO may be displayed as in the first embodiment. The radiologist moves a mouse cursor 91 on the composite two-dimensional image R-MLO and clicks the mouse at a desired position to select the position. The display control unit 51 determines whether or not the selected position is located in the region of interest. In a case in which the selected position is located in the region of interest, the display control unit 51 displays the schema 61, on which a mark M14 indicating the region of interest has been plotted, on the composite two-dimensional image R-MLO as illustrated in FIG. 29. Further, the display control unit 51 surrounds a region of interest R14 at the selected position with a circular mark 92 to highlight the region of interest R14. In addition, the highlighting of the region of interest R14 may not be performed. In addition, in a case in which the selected position is not located in the region of interest, the display control unit 51 may not perform any process or may notify that the position is not located in the region of interest.

Here, in many cases, the composite two-dimensional image is interpreted in a dark room. Therefore, in a case in which the schema is always displayed or the region of interest is always highlighted, the schema and the mark for highlighting are dazzling, which may hinder the interpretation. In the fifth embodiment, in a case in which the selected position is located in the region of interest, the schema is displayed, or the region of interest is highlighted. Therefore, it is possible to prevent the schema or the mark for highlighting from hindering the interpretation.

Further, in the fifth embodiment, the schema is displayed in a case in which the position selected by clicking the mouse is located in the region of interest. However, the present disclosure is not limited to thereto. The schema may be gradually displayed as the mouse cursor is moved on the composite two-dimensional image and approaches the region of interest. In addition, the region of interest may be gradually highlighted as the mouse cursor approaches the region of interest. In this case, as the mouse cursor is moved away from the region of interest, the schema may gradually disappear or the highlighting of the region of interest may be gradually removed.

Figure 30:
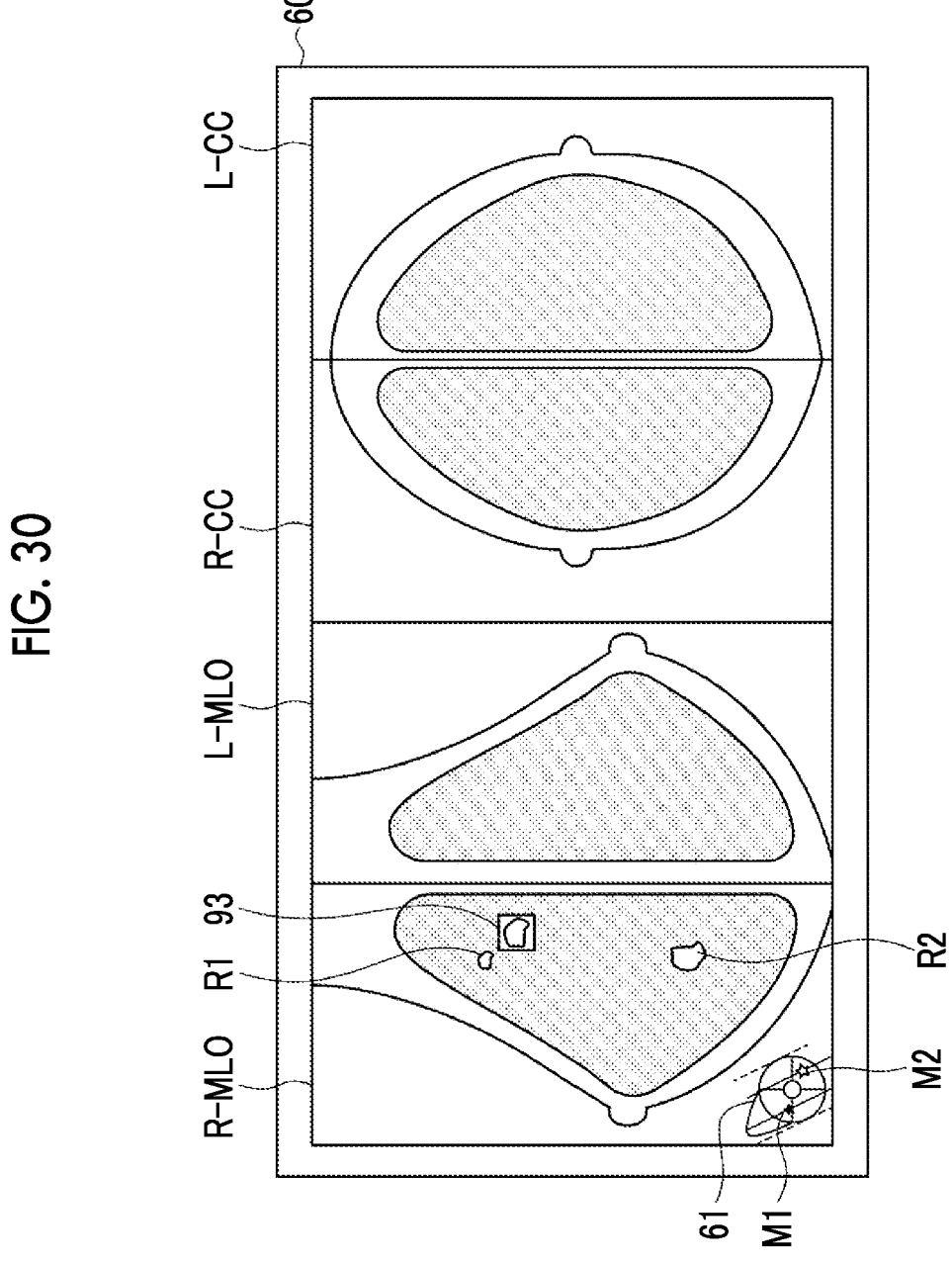
FIG. 30 is a diagram illustrating another aspect of highlighting the region of interest.
Figure 31:
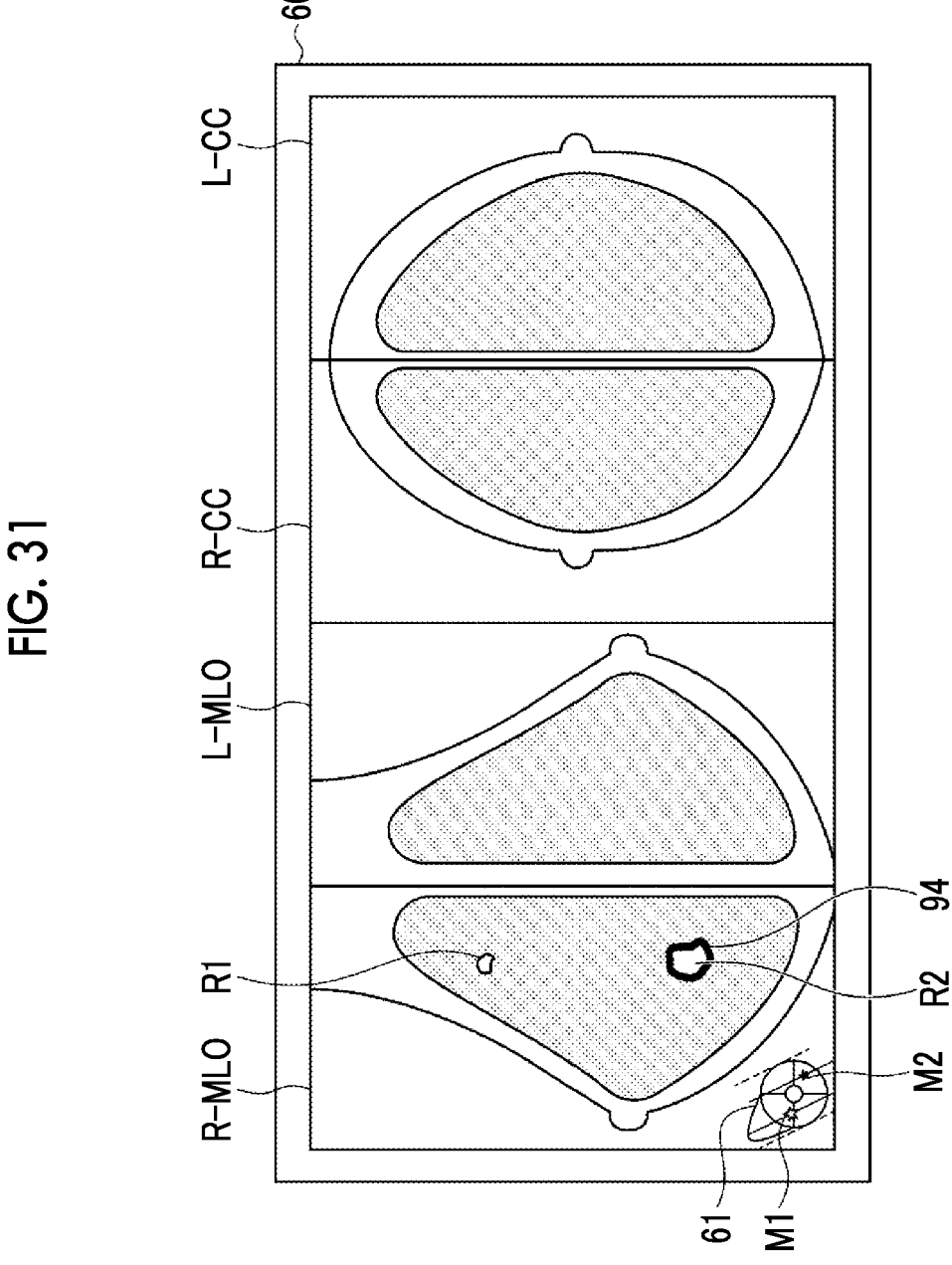
FIG. 31 is a diagram illustrating still another aspect of highlighting the region of interest.

In addition, in each of the above-described embodiments, the mark is given to the region of interest in the composite two-dimensional image to highlight the region of interest. However, the present disclosure is not limited thereto. As illustrated in FIG. 30, instead of the mark, a subwindow 93 for enlarging the region of interest may be displayed near the region of interest to highlight the region of interest. Further, the subwindow 93 may be highlighted in addition to the mark. In addition, as illustrated in FIG. 31, the region of interest may be surrounded with a contour line 94 in the composite two-dimensional image R-CC to be highlighted.

Further, in the above-described embodiments, the console 2 of the mammography apparatus 1 has the functions of the image processing device according to this embodiment. However, the present disclosure is not limited thereto. The projection images acquired by the mammography apparatus 1 may be transmitted to the image storage system 3, and the image storage system 3 may perform the generation of the tomographic images, the detection of the region of interest, the generation of the composite two-dimensional image, and the association between the region-of-interest information and the composite two-dimensional image. In addition, the console 2 may generate the tomographic images and transmit the tomographic images to the image storage system 3, and the image storage system 3 may perform the detection of the region of interest from the tomographic images, the generation of the composite two-dimensional image, and the association between the region-of-interest information and the composite two-dimensional image. Further, an image processing device that is separate from the console 2 and the image storage system 3 may be provided in the radiography system, and the image processing device that is separately provided may perform the detection of the region of interest, the generation of the composite two-dimensional image, and the association between the region-of-interest information and the composite two-dimensional image. In addition, the image processing device that is separately provided may perform the generation of the tomographic images from the projection images in addition to the detection of the region of interest, the generation of the composite two-dimensional image, and the association between the region-of-interest information and the composite two-dimensional image. Further, in the above-described embodiments, the console 2 having the functions of the image processing device detects the region of interest. However, a region-of-interest detection device that is provided separately from the image processing device may detect the region of interest from the tomographic images Dj. In this case, the region-of-interest detection device that is separately provided may store the detection result of the region of interest as the region-of-interest information in a file, such as the DICOM-SR, and transmit the detection result to the image processing device.

Further, the radiation in each of the above-described embodiments is not particularly limited. For example, a-rays or y-rays can be applied in addition to the X-rays.

Furthermore, in each of the above-described embodiments, for example, the following various processors can be used as a hardware structure of processing units performing various processes, such as the image acquisition unit 30, the reconstruction unit 31, the region-of-interest detection unit 32, the combination unit 33, and the storage control unit 34 of the console 2 and the image acquisition unit 50 and the display control unit 51 of the image display device 4. The various processors include, for example, a CPU which is a general-purpose processor executing software (programs) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs or a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured by using one or more of the various processors as a hardware structure.

In addition, specifically, an electric circuit (circuitry) obtained by combining circuit elements, such as semiconductor elements, can be used as the hardware structure of the various processors.

What is claimed is:

1. An image processing device comprising:
at least one processor,
wherein the processor
acquires a detection result of at least one region of interest from a plurality of projection images acquired by performing tomosynthesis imaging on a breast,
reconstructs the plurality of projection images to generate a plurality of tomographic images which indicate tomographic planes of the breast,
derives a composite two-dimensional image using the plurality of projection images,
converts a position of the region of interest into a position in the tomographic image to include the position of the region of interest in the tomographic image in region-of-interest information, and
stores the region-of-interest information including information of the tomographic image corresponding to the region of interest on the composite two-dimensional image and the composite two-dimensional image in association with each other.

2. The image processing device according to claim 1, wherein the processor stores the composite two-dimensional image and the region-of-interest information as separate files.

3. The image processing device according to claim 1, wherein the processor stores the region-of-interest information in accessory information of the composite two-dimensional image to store the region-of-interest information and the composite two-dimensional image in association with each other.

4. The image processing device according to claim 1, wherein the region-of-interest information includes information indicating an outer shape of the region of interest and information for specifying a representative tomographic image that represents the tomographic images including the region of interest.

5. The image processing device according to claim 1, wherein the region-of-interest information includes a reference point in the region of interest, a size of the region of interest, and information for specifying a representative tomographic image that represents the tomographic images including the region of interest.

6. An image display device comprising:
at least one processor,
wherein the processor
acquires the composite two-dimensional image and the region-of-interest information stored by the image processing device according to claim 1,
displays a schema that schematically shows the breast and the composite two-dimensional image, and
displays positions of the region of interest in the displayed schema and composite two-dimensional image in association with each other.

7. The image display device according to claim 6, wherein the processor
displays a list of the detected regions of interest,
plots the position of a region of interest selected from the list of the regions of interest on the schema, and
highlights the selected region of interest in the composite two-dimensional image.

8. The image display device according to claim 6, wherein the processor plots the positions of all of the regions of interest on the schema and highlights a region of interest selected from the regions of interest plotted on the schema in the composite two-dimensional image.

9. The image display device according to claim 6, wherein the processor
displays a generation screen for generating an interpretation report including findings for each of the regions of interest,
displays a list of the detected regions of interest on the generation screen,
plots the position of a region of interest selected from the list of the regions of interest on the schema, and
highlights the selected region of interest in the composite two-dimensional image.

10. The image display device according to claim 9, wherein the processor generates the interpretation report in which a schema on which the positions of the regions of interest have been plotted is described.

11. The image display device according to claim 6, wherein the processor
receives designation of a position in the displayed composite two-dimensional image, and in a case in which a position of the region of interest is designated in the composite two-dimensional image, plots the position of the region of interest, which corresponds to the designated position, on the schema.

12. The image display device according to claim 11, wherein the processor highlights the designated region of interest in the composite two-dimensional image.

13. The image display device according to claim 6, wherein the processor receives movement of a cursor in the displayed composite two-dimensional image, in a case in which the cursor approaches the position of the region of interest in the composite two-dimensional image, plots the position of the region of interest corresponding to a position of the cursor on the schema, and in a case in which the cursor is moved away from the position of the region of interest, removes the plot from the schema.

14. The image display device according to claim 13, wherein the processor highlights the region of interest corresponding to the position of the cursor in the composite two-dimensional image in a case in which the cursor approaches the position of the region of interest in the composite two-dimensional image and removes the highlighting of the region of interest in the composite two-dimensional image in a case in which the cursor is moved away from the position of the region of interest.

15. The image display device according to claim 6, wherein the processor displays slice lines indicating the plurality of tomographic images on the schema.

16. The image display device according to claim 6, wherein the processor further acquires another composite two-dimensional image, which has an imaging direction different from that of the acquired composite two-dimensional image, for the same breast and another region-of-interest information item for the other composite two-dimensional composite image, further displays the other composite two-dimensional image and another schema for the other composite two-dimensional image, and displays the same region of interest in the displayed schema and other schema in association with each other.

17. The image display device according to claim 16, wherein the processor displays the regions of interest having at least one of the same position or the same size in the displayed composite two-dimensional image and other composite two-dimensional image in association with each other.

18. The image display device according to claim 16, wherein the processor receives designation of a position in one of the displayed composite two-dimensional image and other composite two-dimensional image, measures a distance from a reference point to the designated position in the one image, and displays an index indicating the same distance as the measured distance from a corresponding reference point, which corresponds to the reference point of the one image, in the other of the composite two-dimensional image and the other composite two-dimensional image.

19. An image display method comprising:

acquiring the composite two-dimensional image and the region-of-interest information stored by the image processing device according to claim 1;

displaying a schema that schematically shows the breast and the composite two-dimensional image; and displaying positions of the region of interest in the displayed schema and composite two-dimensional image in association with each other.

20. A non-transitory computer-readable storage medium that stores an image display program that causes a computer to execute:

a procedure of acquiring the composite two-dimensional image and the region-of-interest information stored by the image processing device according to claim 1;

a procedure of displaying a schema that schematically shows the breast and the composite two-dimensional image; and a procedure of displaying positions of the region of interest in the displayed schema and composite two-dimensional image in association with each other.

21. An image processing method comprising:

acquiring a detection result of at least one region of interest from a plurality of projection images acquired by performing tomosynthesis imaging on a breast;

reconstructing the plurality of projection images to generate a plurality of tomographic images which indicate tomographic planes of the breast;

deriving a composite two-dimensional image using the plurality of projection images;

converting a position of the region of interest into a position in the tomographic image to include the position of the region of interest in the tomographic image in region-of-interest information; and storing the region-of-interest information including information of the tomographic image corresponding to the region of interest on the composite two-dimensional image and the composite two-dimensional image in association with each other.

22. A non-transitory computer-readable storage medium that stores an image processing program that causes a computer to execute:

a procedure of acquiring a detection result of at least one region of interest from a plurality of projection images acquired by performing tomosynthesis imaging on a breast;

a procedure of reconstructing the plurality of projection images to generate a plurality of tomographic images which indicate tomographic planes of the breast;

a procedure of deriving a composite two-dimensional image using the plurality of projection images;

a procedure of converting a position of the region of interest into a position in the tomographic image to include the position of the region of interest in the tomographic image in region-of-interest information; and a procedure of storing the region-of-interest information including information of the tomographic image corresponding to the region of interest on the composite two-dimensional image and the composite two-dimensional image in association with each other.

* * * * *